US006623809B2

(12) United States Patent
Tsukiashi et al.

(10) Patent No.: US 6,623,809 B2
(45) Date of Patent: Sep. 23, 2003

(54) BATTERY SEPARATOR AND MANUFACTURING METHOD THEREOF, AND ALKALI SECONDARY BATTERY HAVING THE SEPARATOR INCORPORATED THEREIN

(75) Inventors: Masahiko Tsukiashi, Takasaki (JP); Hirohito Teraoka, Takasaki (JP); Katsuyuki Hata, Takasaki (JP); Michiko Tajima, Takasaki (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/413,048

(22) Filed: Oct. 6, 1999

(65) Prior Publication Data

US 2003/0138701 A1 Jul. 24, 2003

(30) Foreign Application Priority Data

| Oct. 30, 1998 | (JP) | 10-311416 |
| Oct. 6, 1998 | (JP) | 10-284471 |
| Dec. 25, 1998 | (JP) | 10-370583 |
| Dec. 25, 1998 | (JP) | 10-370585 |
| Sep. 8, 1999 | (JP) | 11-254338 |

(51) Int. Cl.$^7$ .............................. H05H 1/00; H01M 2/16
(52) U.S. Cl. .................. 427/536; 427/535; 429/247; 429/249
(58) Field of Search .................. 427/532, 535, 427/536, 540, 243; 429/247, 249

(56) References Cited

U.S. PATENT DOCUMENTS

| 3,779,882 A | * | 12/1973 | Rosenthal ................. 204/165 |
| 5,100,723 A | * | 3/1992 | Iwasaki et al. ............. 428/265 |
| 5,543,017 A | * | 8/1996 | Uchiyama et al. .......... 204/169 |
| 5,688,465 A | * | 11/1997 | Myers ....................... 264/423 |
| 5,792,517 A | * | 8/1998 | Takeuchi et al. ............ 427/444 |
| 5,830,603 A | * | 11/1998 | Oka et al. ................... 429/249 |
| 6,352,758 B1 | * | 3/2002 | Huang et al. ............... 428/143 |

* cited by examiner

Primary Examiner—Stephen Kalafut
Assistant Examiner—Julian Mercado
(74) Attorney, Agent, or Firm—Oblon, Spivak, McClelland, Maier & Neustadt, P.C.

(57) ABSTRACT

There is provided a battery separator comprising synthetic resin fibers, wherein hydrophilization treatment, preferably plasma treatment is applied, and a contact angle to pure water indicates a value of 0 to 100 degrees; an alkali secondary battery in which a electrode group having the separator between a positive electrode and a negative electrode is sealed in a battery case together with an alkali electrolyte, in particular, a nickel-metal hydride secondary battery whose positive electrode is a nickel electrode and whose negative electrode is a hydrogen absorbing alloy electrode, wherein active substances of said nickel electrode comprising powders consisting essentially of nickel hydroxides and higher-order cobalt hydroxides formed a surface of a part or whole thereof are employed, thereby providing its superiority in both of self-discharge properties and charge and discharge cycle life performance.

11 Claims, 13 Drawing Sheets

BATTERY SEPARATOR AND MANUFACTURING METHOD THEREOF, AND ALKALI SECONDARY BATTERY HAVING THE SEPARATOR INCORPORATED THEREIN

BACKGROUND OF THE INVENTION

1. Field of the Invention

The present invention relates to a battery separator and a manufacturing method thereof, and an alkali secondary battery having the separator incorporated therein, in particular to a nickel-metal hydride secondary battery. More particularly, the present invention relates to a battery separator and a manufacturing method thereof in which preferred hydrophilization treatment is applied, and thus, an alkali secondary battery having the separator incorporated therein causes its superior self-discharge properties; and a nickel-metal hydride secondary battery having the separator incorporated therein, its superior self-discharge properties, and superior charge and discharge cycle life performance.

2. Prior Art

In recent years, with advancement of cordless use, high performance, down-sizing, and reduced weight of various electronic devices such as hand-held telephone or hand-held type personal computers, there has been a growing need for a secondary battery with high-capacity being a power source of these devices.

As power sources of these electronic devices, alkali secondary batteries have been generally employed, and specifically, secondary nickel-cadmium batteries has been mainly used. With a growing demand for the above-mentioned high capacity, recently, secondary nickel-hydrogen batteries are widely used because they are compatible with voltages of the secondary nickel-cadmium batteries, and have higher capacity than the secondary nickel-cadmium battery.

However, there is a problem that, although such secondary nickel-hydrogen batteries have high capacity than the nickel-cadmium batteries, self-discharge is likely to occur if they are in charged state, and maintained under high-temperature environment.

Therefore, corresponding to the fact that use environment of the secondary nickel-hydrogen-batteries is diversified, and these batteries are increasingly used under severe conditions, it is of course that the secondary nickel-hydrogen batteries have high capacity, and it is strongly required that the batteries have improved self-discharge properties and charge and discharge cycle life performance.

In the meantime, an alkali secondary battery is manufactured as follows: In general, a paste consisting of an active substance and a bonding agent is applied to and filled in a collector to manufacture positive and negative electrodes, respectively; an electrode group (generator element) consisting of a separator intervened between the positive and negative electrodes is manufactured; the electrode group is housed in a battery case together with an alkali electrolyte; and then, the battery case is sealed.

For example, in the case of a nickel-metal hydride battery, in general, a separator is intervened between a nickel electrode (a positive electrode) for supporting powders of nickel compounds such as nickel hydroxides and a hydrogen absorbing alloy electrode (a negative electrode) for supporting powders of hydrogen absorbing alloys to form an electrode group; this electrode group is housed in a battery case compatible with a negative electrode terminal together with an alkali electrolyte, and the battery case is sealed.

In such nickel-metal hydride secondary battery, it is of course that the separator must have electric insulation properties, and it is required that the separator has good wettability with an filled alkali electrolyte, whereby it is required to provide electrolyte absorption properties for the alkali electrolyte.

From the foregoing, as a separator, a non-woven fabric consisting of polyamide fibers having good hydrophilicity is widely employed to ensure wettability with the alkali electrolyte.

However, this polyamide fibers are hydrolyzed in an alkali electrolyte, and impurities such as ionic nitrate, nitrous ion, or ammonia, for example, are produced. These impurities cause so-called shuttle reaction, and reduces nickel oxy-hydroxide produced on a nickel electrode during charging, thereby promoting self-discharge in the nickel electrode and degrading battery self-discharge properties.

From the foregoing, as the separator materials, there are attempted selection of fiber materials having oxidization proof superior to the polyamide fibers, for example, polyolefin fibers such as polypropylene fibers, or fluoro resin fibers such as PTFE fibers, and use of which hydrophilization treatment is applied thereto.

Specifically, for example, there is attempted use of a separator in which a non-woven fabric made of polyolefin fibers is surface-treated by an anionic, cationic, or non-ionic surface active agent.

However, the thus manufactured separator ,is not fixed with a hydrophilic group introduced by the surface active agent, which is chemically bonded with a surface of a separator material. Thus, there is a problem that, if battery charging and discharging are repeated, a surface active agent is left from the surface, hydrophilicity are lowered, resulting in lowered charge and discharge cycle life performance.

In addition, the following treatment is attempted: A treatment such as sulphonation treatment or acrylic acid graft treatment is carried out on the full surface of a non-woven fabric made of polyolefin fibers, whereby a hydrophilic active group is added from the outside, and hydrophilicity of the entire surface of the non-woven fabric is enhanced to improve self-discharge properties. Even if these treatments are carried out, self-discharge properties are not sufficiently improved. Moreover, in the case of these treatments, since waste treatment of used chemicals is required, there is a problem that separator manufacturing cost and battery manufacturing cost are increased.

Further, in the case of the nickel-metal hydride secondary battery, it is known that self-discharge is promoted by hydrogen being left from a hydrogen absorbing alloy used for a negative electrode. The mechanism is described as follows:

When a nickel-metal hydride secondary battery is stored under a high temperature, an equilibrium pressure of a hydrogen absorbing alloy for a negative electrode rises together with a temperature rise, and a quantity of hydrogen capable of being absorbed by the negative electrode decreases. As a result, hydrogen gas which cannot be accumulated by the negative electrode is discharged into a battery. This hydrogen permeates the separator, reaches a surface of a nickel electrode, reduces a nickel oxy-hydroxide being a charged product of the nickel electrode, and causes self-discharge.

Thus, requirements for improvement of self-discharge properties of an alkali secondary battery, in particular, a nickel-metal hydride secondary battery are that a separator to be incorporated is composed of materials without producing the aforementioned impurities, and that high hydrophilicity are imparted, thus making it possible to ensure wettability with an alkali electrolyte over a long period of time.

On the other hand, when electric conductivity between active substances (nickel hydroxides) in the aforementioned nickel electrode and between an active substance and a collector is increased, the utility of the active substance is increased. Also, since a firm electrically conductive matrix is formed at the surface of nickel hydroxide powder, self-reducibility of the nickel electrode per se is suppressed. In this manner, the charge and discharge cycle life performance of the secondary nickel-hydrogen batteries having the nickel electrode incorporated herein are improved.

Therefore, conventionally, the following method is carried out for the purpose of increasing the utility of the active substance and improving the charge and discharge cycle life performance.

For example, when a positive electrode synthetic agent to be filled in or applied to a nickel electrode is paste-prepared, cobalt compounds such as cobalt metals, cobalt hydroxides, cobalt tri-oxides, tri-cobalt tetra-oxides, or cobalt monoxides or a predetermined amount of particles of a mixture of these compounds are added as an electric conducting material, mixed powders mixed with powders of nickel hydroxides at a predetermined rate is produced, and the produced powders are used as an active substance.

When a nickel electrode on which the thus produced active substance powders are supported is incorporated as an alkali secondary battery (a nickel-metal hydride secondary battery), a cobalt metal or cobalt compound contained in the above mentioned active substance powders is temporarily dissolved in an alkali electrolyte to be a complex ion, and the complex ion covers a surface of nickel oxide powders. Further, during initial battery charging, these complexions are oxidized prior to nickel hydroxides; the oxidized ion is converted to a higher-order oxide consisting essentially of an electric conducting cobalt oxy-hydroxides; the converted oxide is deposited between nickel oxide powders being an active substance and between an active substance layer and a collector; and a so-called electric conducting matrix is formed. As a result, electric conductivity between active substances and between an active substance and a collector is improved, whereby the utility of active substances is improved.

In addition, it is also known that, while the aforementioned metal cobalt or cobalt compound and nickel oxide powders are mixed with each other at a predetermined rate under an oxygen-containing atmosphere, a predetermined amount of alkali aquous solution is added herein at the same time, and the entirety is irradiated with microwaves, for example, and is heated uniformly at a predetermined temperature, thereby producing an active substance.

In this case, a part of a cobalt metal or cobalt compound is dissolved in the added alkali aquous solution to be a complex ion, the complex ion covers a surface of nickel oxide powders, and at the same time, is converted to a higher-order cobalt oxide. Thus, an active substance to which the above treatment has been applied has a higher-order cobalt oxide layer already formed on the nickel oxide powder surface being an intrinsic active substance.

OBJECTS AND SUMMARY OF THE INVENTION

It is one object of the present invention to provide a battery separator having its superior hydrophilicity and a manufacturing method thereof without producing impurities that cause the above mentioned shuttle reaction when the separator is incorporated in a battery.

It is another object of the present invention to provide an alkali secondary battery having its superior self-discharge properties, in particular, a nickel-metal hydride secondary battery by incorporating the above mentioned separator.

It is a further object of the present invention to provide a nickel-metal hydride secondary battery having both of its improved self-discharge properties and charge and discharge cycle life performance.

To achieve the foregoing objects, according to the present invention, there is provided a battery separator consisting of: synthetic resin fibers, wherein hydrophilization treatment is applied, and a contact angle relative to a pure water indicates 0 to 100 degrees. Preferably, there is provided a battery separator, wherein the hydrophilization treatment is carried by plasma treatment, an area with a certain difference in hydrophilicity is formed in a surface or thickness direction, an material thereof is a non-woven fabric consisting of a polyolefin based synthetic resin fibers, a specific surface area for the non-woven fabric is 0.5 to 5.0 m$^2$/g, plasma treatment using $O_2$ gas is further applied to the separator, and when ESCA (Electron Spectroscopy for Chemical Analysis) measurement is carried out, the O/C ratio in a site of at least 20 Å in depth is 0.01 to 0.6.

In addition, according to the present invention, there is provided a manufacturing method of the battery separator comprising: arranging a separator material consisting of synthetic resin fibers on the earth electrode of a plasma treatment apparatus wherein a power electrode and an earth electrode are arranged in parallel; and performing plasma treatment for the separator in an atmosphere containing at least gas for imparting hydrophilicity.

In particular, there is provided a manufacturing method of battery separator, wherein the aforementioned atmosphere is an atmosphere of a mixture gas between a gas for imparting hydrophilicity and a gas for imparting hydrophobicity, and the aforementioned plasma treatment is a plasma treatment carried out in the gas for imparting hydrophobicity after being carried out in the gas for imparting hydrophilicity or carried out in the gas for imparting hydrophilicity after being carried out in the gas for imparting hydrophobicity; the plasma treatment is carried out in a state in which a surface of the aforementioned earth electrode is not exposed to the aforementioned atmosphere; the aforementioned gas for imparting hydrophilicity is at least one selected from the group consisting of oxygen, nitrogen, air, nitrogen oxides, ammonia and carbon dioxide; and the aforementioned gas for imparting hydrophobicity is at least one selected from the group consisting of tetra-fluorinated carbon, tetra-fluorinated ethylene, and hexa-fluorinated ethane.

Further, according to the present invention, there is provided an alkali secondary battery comprising: electrode groups having the separator intervened between positive and negative electrodes being sealed in a battery case together with an alkali electrolyte.

In particular, according to the present invention, there is provided a nickel-metal hydride secondary battery comprising: the electrode groups having the separator intervened between a nickel electrode and a hydrogen absorbing alloy electrode being sealed in a battery case together with an alkali electrolyte, an active substance of the nickel electrode comprising powders consisting essentially of nickel hydroxides and higher-order oxides of cobalt formed on a surface of a part or whole thereof.

DETAILED DESCRIPTION OF THE INVENTION

Figure 1:
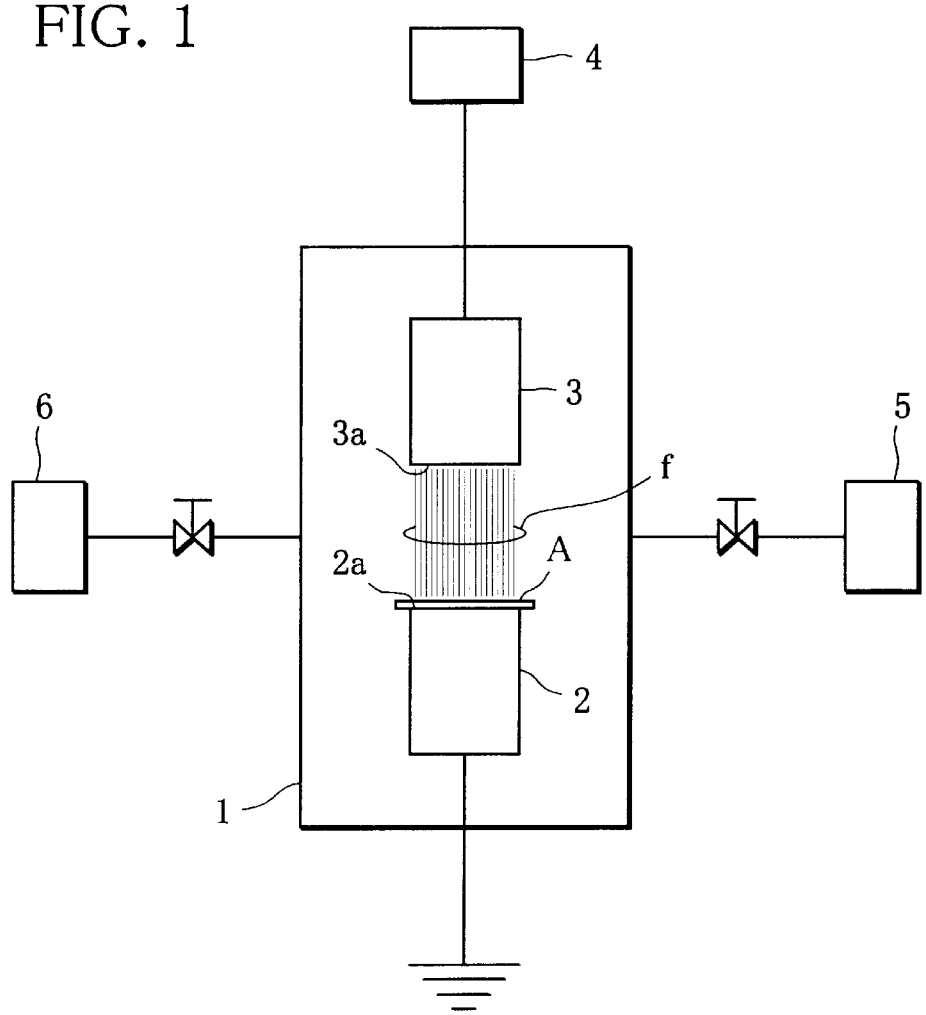
FIG. 1 is a schematic view showing a plasma treatment apparatus.

A battery separator according to the present invention comprises synthetic resin fibers, and is subjected to hydrophilization treatment. Hydrophilicity by the hydrophilization treatment is such that a contact angle relative to pure water indicates a value of 0 to 100 degrees.

Specifically, synthetic resin fibers being a starting material of the separator according to the present invention include polyolefin fibers such as polyethylene fibers or polypropylene fibers or itself; complex fibers having their core-sheath structures in which a surface of a polyolefin fiber is covered with a different kind of polyolefin fiber; and complex fibers having their separate structures of different kinds of polyolefin fibers from each other. In addition, PTFE fibers can be used, but in this case, the entire mechanical strength may be increased by mixing inorganic fibers such as glass fibers, for example. The above mentioned fibers are hydrophobic in their surfaces.

Since the separator according to the present invention employs a material having its superior oxidization proof, even if the separator comes into contact with an alkali electrolyte, it is not hydrolyzed, and impurities causing the aforementioned shuttle reaction is not produced. For example, reduction of a charged product (nickel oxyhydroxide) in a nickel electrode is not promoted.

Although the separator material is preferably formed of a non-woven fabric made of the above mentioned fibers, it may be formed of finely porous plastic sheets. When the separator material is formed of a non-woven fabric, the non-woven fabric allows the above mentioned fibers to be woven by a dry-type method, wet method, a span bond method, a melt blow method or the like.

When the separator material is formed of a non-woven fabric, the basis weight is preferably 30 to 70 g/m$^2$. If the non-woven fabric is smaller than 30 g/m$^2$ in basis weight, the separator material strength is low, and thus, the material is easily damaged during winding when the aforementioned electrode groups are manufactured. Conversely, if the cloth is heavier than 70 g/m$^2$ in basis weight, the occupying volume of the separator when the electrode groups are manufactured is increased, and the electrode capacity is lowered.

In addition, there is preferably employed a separator material in which the specific surface area during measurement with a BET 1-point method using nitrogen indicates 0.5 to 5.0 m$^2$/g. When a separator material whose specific surface area is less than 0.5 m$^2$/g is employed, the electrolyte absorption properties of the manufactured separator is lowered. In addition, when a separator material whose specific surface area is bigger than 5.0 m$^2$/g is employed, its tension strength is lowered, the separator is easily deformed, and the separator is easily damaged during winding when the electrode groups are manufactured. A separator material whose specific surface area is 1.0 to 4.0 m$^2$/g is particularly preferred.

The separator according to the present invention is manufactured by applying hydriphilization treatment described later to the separator material, and hydrophilicity indicated by the above mentioned contact angle is imparted.

The contact angle denotes a value obtained when a manufactured separator (about 2.5 cm in length and 10 cm in width) is placed horizontally; pure water (about 10 $\mu$l) is dropped on a surface of this separator, and left as is for 1 minute, the pure water is absorbed into a network of separator, and then, a contact angle of water droplets existing on the separator surface is measured by an optical microscope (for example, a goniometer type contact angle measuring instrument).

That is, when this value is small, it denotes that a separator has its preferable hydrophilicity, and the separator itself has its superior alkali electrolyte absorption properties. Conversely, when the value is great, it denotes that the separator exhibits water repellency, and the alkali electrolyte absorption properties are impaired. In the case of a non-woven fabric made of polyolefin based synthetic resin fibers without hydrophilization treatment described later, for example, its contact angle indicates a value from 120 to 130 degrees.

In the case where a contact angle of the separator exceeds 100 degrees, an alkali electrolyte insufficiently permeates into the separator, and an internal resistance of a battery rises because the separator has its inferior electrolyte absorption properties. In addition, since an alkali electrolyte is not maintained sufficiently in a network of fibers constituting the separator, the electrolyte does not spread sufficiently in the battery, and the initial capacity is lowered. Alternately, the alkali electrolyte maintained in the separator is absorbed by a bonding agent for the positive and negative electrodes or expansion of the positive electrode. In the case where the nickel-metal hydride secondary battery is maintained at a high temperature, a hydrogen gas left from a negative electrode permeates the separator, reaches a surface of a positive electrode, and reduces a nickel oxy-hydroxide of the positive electrode. Thus, self-discharge properties are lowered.

On the other hand, when the above contact angle is within the range of 0 to 100 degrees, fibers constituting the separator is sufficiently hydrophilized, and thus, an alkali electrolyte permeates and is maintained in a very small space inside of the separator. This alkali electrolyte is maintained in a network of fibers constituting the separator, and its movement is prevented. Thus, the electrolyte in the separator resists against an action from a positive or negative electrode to absorb the alkali electrolyte. Further, in the case of the nickel-metal hydride secondary battery, a water screen is rigidly formed on a surface of the positive electrode arranged in intimate contact with the separator by the alkali electrolyte maintained in the network of fibers constituting the separator. Thus, the hydrogen gas left from the negative electrode is suppressed from permeating the separator and directly reaching the surface of the positive electrode. As a result, self-discharge is restricted.

As a hydrophilization treatment method, although there may be any one of the conventionally known methods including acrylic acid graft treatment, sulphonation treatment, fluoridation treatment or the like, it is preferred to apply plasma treatment to which attention is recently focused as a surface reforming method. This plasma treatment is carried out in an gas phase, thus making it possible to introduce a hydrophilic group throughout the network of fibers constituting the separator material and increase a reduction effect of a contact angle. In addition, in comparison with sulphonation treatment, impurities are less produced during hydrophilization treatment.

Now, plasma treatment preferably employed as hydrophilization treatment according to the present invention will be described.

In the plasma treatment apparatus to be employed, as shown in FIG. 1, an earth electrode 2 and a power electrode 3 are arranged in parallel with a predetermined interval in a closed container 1, and the power electrode 3 is connected to a power source 4. Respective opposite faces 2a and 3b of the earth electrode 2 and the power electrode 3 are generally shaped in circles of their predetermined diameter. A pressure reducing mechanism 5 is connected to the closed container 1 so that an internal pressure of the closed container 1 can be reduced to a predetermined degree of vacuum.

In addition, a gas supply mechanism 6 is connected to the closed container 1. When an apparatus is operated, a gas described later is supplied into the container therefrom, whereby a hydrophilic functional group can be introduced on a surface of a separator material targeted for treatment.

When this apparatus is operated, separator material A targeted for treatment is arranged between the earth electrode 2 and the power electrode 3. In general, the separator material is arranged on a surface of the earth electrode 2.

Then, the pressure reducing mechanism 5 is operated, and the internal pressure of the closed container 1 is temporarily reduced. Further, while a predetermined gas is supplied from the gas supply mechanism 6, the inside of the closed container 1 is maintained to 0.05 to 1 Torr in degree of vacuum, for example. The power electrode 3 and the earth electrode 2 are operated, a high-frequency electric field is formed between these electrodes, and a plasma 'f' is generated therebetween.

Specifically, in an output of 5 to 1,000 W, power discharge is carried out using high-frequency of 13.56 MHz in radio frequency or microwaves of 2.54 GHz, and plasma treatment is applied to the separator material A arranged between the electrodes. The treatment time is preferably set to 0.1 to 30 minutes.

If plasma treatment is carried out under conditions different from the above treatment conditions, hydrophilization treatment becomes insufficient though the treatment conditions may vary depending on the distance between the power and earth electrodes and the electrode diameters, making it difficult to ensure movement of ions or water required for battery reaction. Further, on the contrary, plasma reaction is excessively promoted, fibers constituting a separator material are cut or destroyed, the separator material is deformed due to thermal shrinkage, thus making it difficult to incorporate the separator into a battery.

An example of parameters for plasmas generated under the above conditions is shown as follows: 2000 to 4000° K. in electron temperature; $10^9$ to $10^{13}$ pieces/cm$^3$ in electron density; 200 to 400° K. in ion temperature; $10^9$ to $10^{13}$ pieces/cm$^{-3}$ in ion density; and 10 to 90 V in plasma spatial potential.

In plasma treatment carried out under the above conditions, at least gas for imparting hydrophilicity is supplied from the gas supply mechanism 6.

As the gas for imparting hydrophilicity, there can be used a gas for introducing a hydrophilic functional group such as carbonyl group, carboxyl group, hydroxide group, amino group, or imino group into fibers constituting the separator material, for example, one or two or more selected from oxygen gas, nitrogen gas, air, nitrogen oxides, ammonia, and carbon dioxide.

By the above plasma treatment, a hydrophilic functional group such as hydroxide group, carbonyl group, carboxyl group, hydroxide group, amino group, or imino group is chemically introduced into and fixed to a surface of fibers constituting the separator material. In particular, the hydroxide group, carbonyl group, or carboxyl group has its great polarity and superior hydrophilicity. Unlike the amino or imino group, it does not contain a nitrogen atom, and does not cause self-discharge due to shuttle reaction. From the foregoing, as a functional group, the hydroxide group, carbonyl group, or carboxyl group is preferably introduced.

Therefore, the above plasma treatment is preferably applied in an atmosphere containing an oxygen gas. In this case, only the hydroxide group, carbonyl group, or carboxyl group is introduced into and fixed to fibers constituting the separator material by the oxygen contained in the above atmosphere, and further, there is lower possibility of causing shuttle reaction due to the presence of the amino group. In particular, it is preferable that the above atmosphere is substantially composed of only the oxygen gas. If the rate of oxygen gas contained in the atmosphere is low, the above hydroxide group is hardly formed, an amino group or the like is formed due to the nitrogen gas mixed in the atmosphere, and the amino group or the like can be introduced. In addition, in the case where radicals are formed in fibers constituting the separator material by plasma treatment, when the air is introduced into the apparatus by releasing the pressure reduction in the apparatus, the nitrogen or the like in air may react with the radicals in fibers.

From the gas supply mechanism 6, a gas for imparting hydrophobicity may be mixed with the above gas for imparting hydrophilicity to be supplied.

As the gas for imparting hydrophobicity, there can be used a gas capable of introducing a hydrophobic group into fibers constituting the separator, for example, tetra-fluorinated carbon, tetra-fluorinated ethylene, or hexa-fluorinated ethane.

With respect to the mixture rate of the gas for imparting hydrophilicity to the gas for imparting hydrophobicity, the partial pressure of the former is preferably 30% or more.

If the mixture rate is outside the above value or if the plasma treatment conditions are outside the aforementioned range, a balance between hydrophilicity and hydrophobicity in the separator after the treatment is worsened, possibly causing inconvenience that ion or water movement during battery reaction is not smoothly promoted; causing breakage of fibers constituting the separator or separator deformation due to thermal shrinkage; or causing inconvenience that manufacturing of electrode groups is difficult.

Although the above example assumes that plasma treatment is carried out in a mixture gas between the gas for imparting hydrophilicity and the gas for imparting hydrophobicity, separator material treatment is not limited to the above mode. The plasma treatment may be carried out in the gas for imparting hydrophobicity after being carried out in the gas for imparting hydrophilicity and vice versa.

In an alkali secondary battery in which the above plasma treatment is applied to a separator material, and then, an electrode group manufactured using the separator is incorporated, in particular, in the nickel-metal hydride secondary battery, self-discharge is effectively restricted.

The reason is not clear, but is considered as follows:

A hydrophilic functional group and a hydrophobic group are introduced into fibers constituting the separator by the above mentioned plasma treatment, whereby a hydrophilic part and a hydrophobic part coexist in the separator at a predetermined area rate. It is considered that the hydrophobic part traps nitrogen radicals associated with its: self-discharge or the impurities eluted from an active substance to induce self-discharge. In addition, the hydrophilic and hydrophobic parts coexist, whereby distributions of the alkali electrolytes in the separator change. It is also considered that the hydrogen gas discharged from a negative electrode hardly reaches a positive electrode as a result of such change.

In addition, plasma treatment using inert gas such as Ar or He is carried out for the separator, radicals are generated at the constituent fibers, and then the plasma treated separator may be removed in air. In this case, with the generated radicals as a medium, a hydrophilic functional group such as hydroxide group is introduced into the constituent fibers.

During the above plasma treatment, the entire surface of the separator material is included in the generated plasmas. Thus, in the case where the entire surface of the separator material is not plasma-treated rather than in the case where the entire surface is plasma-treated uniformly, the self-discharge properties of the alkali secondary battery assembled by using the obtained separator, in particular, those of the nickel-metal hydride secondary battery are improved more significantly.

That is, a separator in which an area whose surface has a certain difference in hydrophilicity is formed achieves an improved effect in self-discharge properties.

The above state in which an area whose surface has a certain difference in hydrophilicity denotes as follows: The surface of the plasma-treated separator is not made uniformly by carrying out plasma treatment as described later. In one separator, the entire surface is hydrophilized, but a part of the surface is strongly plasma-treated in plane or in thickness direction, and a hydrophilic functional group is introduced in large quantity and rigidly. A functional group is less introduced or is not introduced into the remaining part at all, and hydrophobicity of synthetic fibers being a separator material still remains.

Such area having a certain difference in hydrophilicity can be formed as follows.

Figure 2:
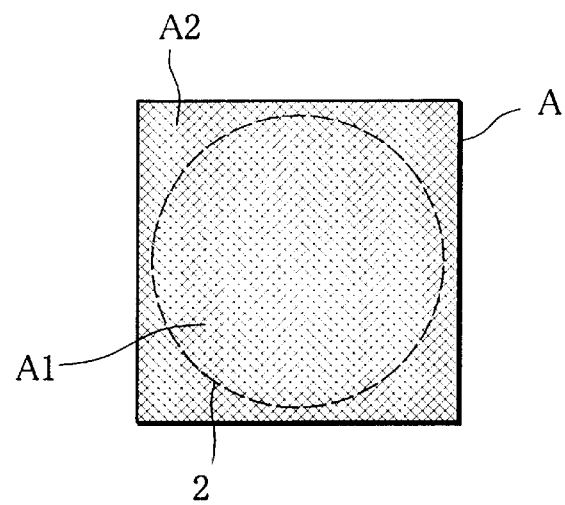
FIG. 2 is a plan view showing an example when a separator material is arranged on an earth electrode.

For example, as shown in FIG. 2, when separator material A is placed on an earth electrode 2 and treated with the surface of the earth electrode such that it is completely covered, a portion A1 of the separator material A is plasma-treated strongly than a portion A2 positioned in the outside of the earth electrode, resulting in a high hydrophilic area. Moreover, at the above portion A1, the central part is plasma-treated more strongly. Thus, the hydrophilicity of the portion A1 is the highest at the center part, and is reduced more gradually at the outer side.

Therefore, the entire surface of the separator after the treatment becomes hydrophilic, and moreover, an area having its different hydrophilicity is formed from its center part to the outside.

Figure 3:
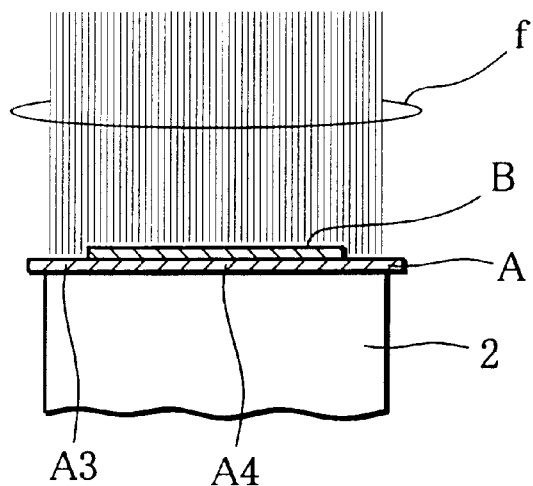
FIG. 3 is a plan view showing another example when a separator material is arranged on an earth electrode.

In addition, in the case of an arrangement mode as shown in FIG. 3, an area having a certain difference in hydrophilicity can be formed as follows:

First, separator material A targeted for treatment is placed on the earth electrode 2. Then, on this separator material A, material B, which is smaller than the material A and in which plasmas can be transmitted, for example, a material identical to the separator material A is further placed, and is treated by plasma 'f'.

Portion A3 positioned in the outside of separator B is strongly treated by the plasma 'f', resulting in being a high hydrophilic area. However, although portion A4 covered with material B is treated by plasmas which has transmitted the material B, the degree of treatment is smaller than in the case of portion A3, and the hydrophilicity of the portion A4 is lower than that of the portion A3.

In this case also, an area having a certain difference in hydrophilicity is formed on the surface of the separator obtained after the treatment.

Figure 4:
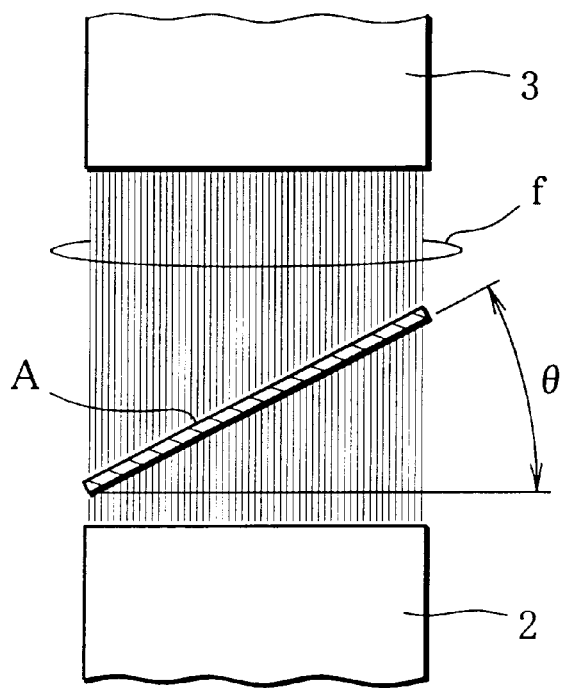
FIG. 4 is a side view showing an example when a separator material is arranged.

Further, in place of directly placing the separator material A targeted for treatment on the earth electrode 2 as described previously, the material A may be arranged with the material being inclined between the earth electrode 2 and the power electrode 3 at a predetermined angle θ as shown in FIG. 4.

In this case, the entirety of the separator material A included in the plasma 'f' is not treated uniformly by the plasma 'f', and the treatment state varies along an inclined face. Therefore, a hydrophilic area in which hydrophilicity varies slantwise is formed on the surface of the separator obtained after the treatment.

Figure 5:
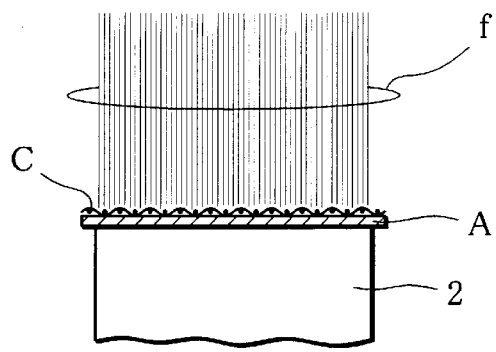
FIG. 5 is a side view showing another example when a separator material is arranged.

As shown in FIG. 5, after the separator material A targeted for treatment has been placed on the earth electrode 2, mask C of a predetermined pattern consisting of titanium and stainless steel, for example, which do not transmit plasma, for example, may be further placed and treated thereon.

In this case, since a portion of the separator material positioned immediately beneath mask C is not plasma-treated, the hydrophobicity of the constituent resin fibers remains as it is, and the other portion is plasma-treated, and is converted to a hydrophilic area.

Therefore, in this case, the hydrophilic and hydrophobic area coexist on the surface of the separator obtained after the treatment.

In addition, during separator material plasma treatment, the separator material A is preferably arranged so that the surface of the earth electrode 2 is not exposed.

Figure 6:
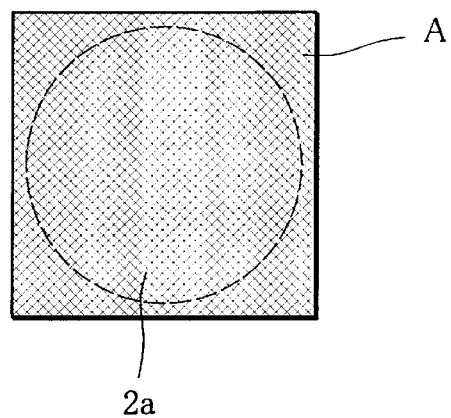
FIG. 6 is a plan view showing an example when a separator material is arranged on an earth electrode.
Figure 7:
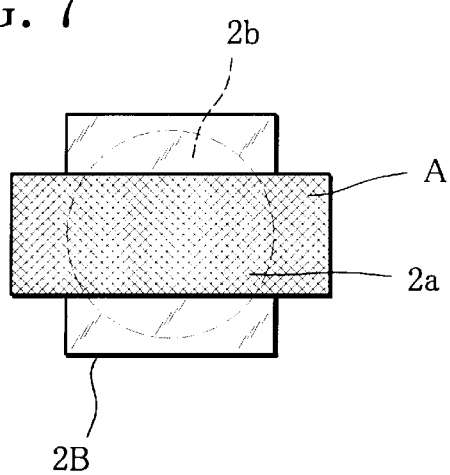
FIG. 7 is a plan view showing another example when a separator material is arranged on an earth electrode.

Specifically, as shown in FIG. 6, separator material A larger than the earth electrode in size is employed, and is arranged so as to cover the full surface of the surface 2a of the earth electrode 2. When the surface 2a of the earth electrode 2 is larger than the separator material A in size, as shown in FIG. 7, a portion 2b exposed toward the power electrode 3 without being covered with the separator material A may be covered with another insulation material 2B such as polypropylene film, for example.

In this manner, when plasma treatment is carried out with the surface 2a of the earth electrode 2 being not exposed, it is considered that a hydrophilic functional group is preferably introduced into the surface of the separator material A for the reasons stated below.

In general, when plasmas are generated with gas being introduced, the generated field is composed of electrons, gas ions, radicals, lights or the like. C—H bond of a synthetic resin constituting separator material A is attacked by these electrons, ions, radicals or the like, H is left. Thereafter, radicals are formed, and a functional group of the generated gas is introduced herein, thereby separator material hydrophilization is promoted. The above process is advanced as competitive reaction, and the functional group into which a constituent resin of the separator material is temporarily introduced may be left again depending on operating conditions.

At this time, when plasma treatment is carried out with the earth electrode 2 being larger than the separator material A arranged thereon in size, a sheath voltage of the power electrode is higher than that of a site covered with the separator material A in the vicinity of the exposed earth electrode. Thus, electrons, ions or the like flying in the vicinity thereof are accelerated, and their motion energies are increased.

A portion of the separator material A positioned in the vicinity thereof are severely attacked by particles having large motion energies, in particular, ions of the generated gas. So, it is considered that the temporarily introduced functional group, for example, is purged again or that a chain-like lattice part of resin fibers constituting the separator material A is attacked, and is cut or destroyed. That is, it is considered that separator material hydrophilization is inhibited, and the separator material itself is damaged.

On the contrary, in the case where the surface of the earth electrode 2 is not exposed, the above mentioned circumstance hardly occurs. In addition, the separator material A is electrically charged due to the flied ions or electrons, and radicalization action of the separator material against the resin fibers due to ions is effectively promoted. As a result, it is considered that the functional group is effectively introduced into the fibers.

Therefore, the obtained separator is structured so that a functional group is introduced into resin fibers constituting the separator, and moreover, is structured to be hardly damaged.

In the above mentioned plasma treatment, in the case where excessive hydrophilization treatment is applied in the thickness direction of the separator, when the separator is incorporated in a battery, the separator excessively stores an alkali electrolyte, resulting in deterioration of battery properties. In addition, the strength of fibers constituting the separator may be lowered and damaged during manufacture of electrode groups.

In view of the foregoing, for example, in the case where plasma treatment is carried out using $O_2$, when ESCA measurement is performed for the separator after the treatment, hydrophilization is preferably obtained such that the O/C ratio in a site of at least 20 Å in depth indicates a value of 0.01 to 0.6.

Now, an alkali secondary battery having the separator incorporated herein, in particular, a nickel-metal hydride secondary battery will be described.

Separator made by the method described-above is intervened between a positive and negative electrodes, to make electrode groups. The electrode groups are sealed in the battery case with alkali battery electrolyte. Thus, alkali secondary battery of the invention is assembled.

The structure of alkali secondary battery of the invention is described with nickel-metal hydride secondary battery as an example.

Figure 8:
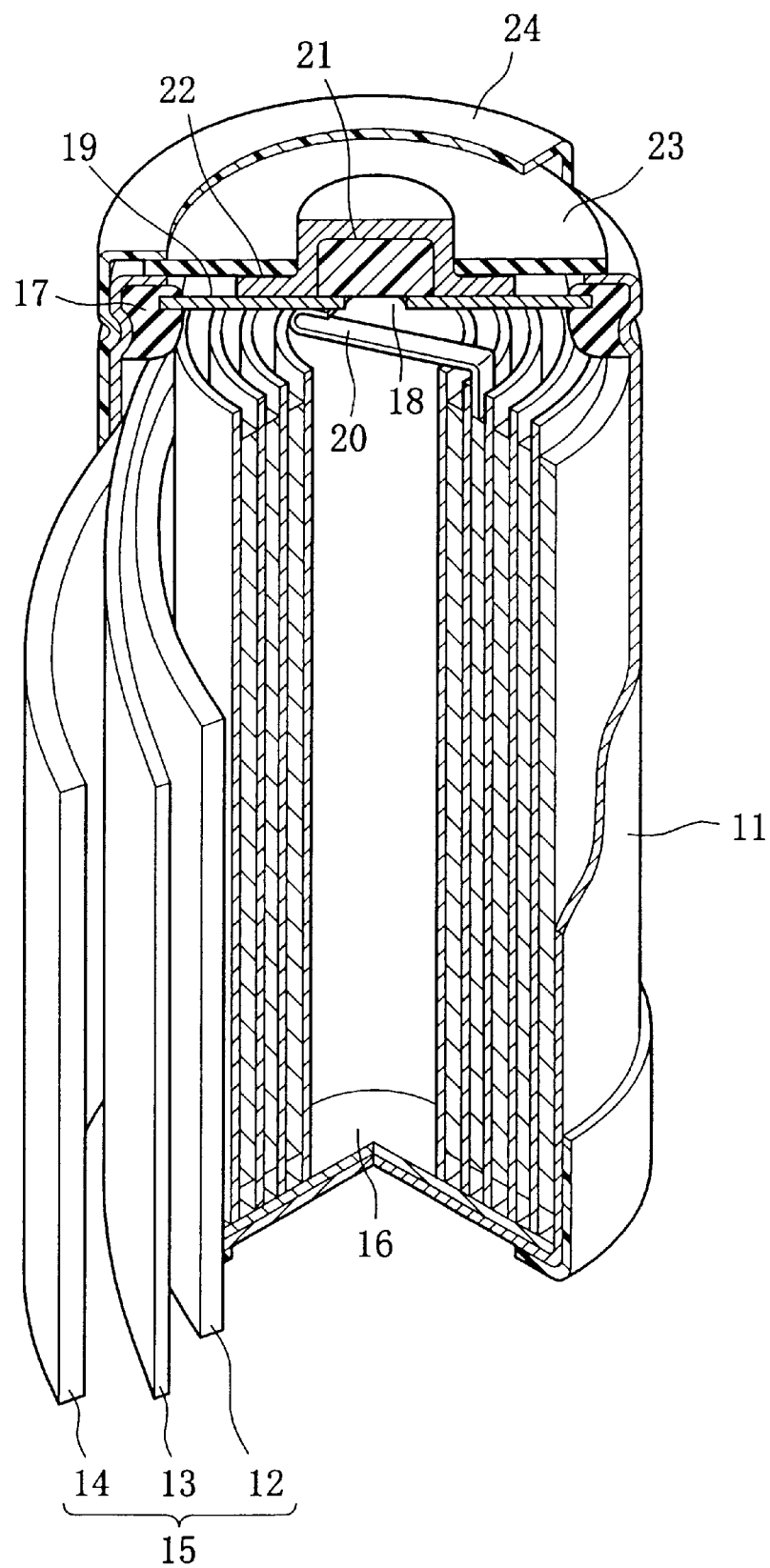
FIG. 8 is a partial cut-out perspective view showing a cylindrical nickel-metal hydride secondary battery having the separator of the present invention incorporated herein.

In FIG. 8, in a bottomed cylindrical battery case 11, there is housed an electrode group 15 in which a sheet having a positive electrode (nickel electrode) 12, a separator 13 according to the present invention as described previously, and a hydrogen absorbing alloy electrode (negative electrode) 14 laminated thereon is wound in spiral shape. The negative electrode 14 is arranged on the outer-most side of the electrode group 15, thereby coming into electrical contact with the battery case 11. In addition, the bottom of the electrode group 15 is positioned on the insulation plate 16 arranged on the bottom of the battery case 11.

A ring-shaped insulation gasket 17 is arranged inside of a top opening of the battery case 11, and a first disc-shaped sealing plate 19 having a hole 18 at the center thereof is arranged in a state in which the periphery of this insulation gasket 17 bites with the ring-shaped insulation gasket 17. Clamping process is carried out such that the top opening of the battery case 11 is reduced inwardly in diameter, whereby the first sealing plate 19 seals the top opening of the battery case 11 via the insulation gasket 17 in air tightness.

In addition, a lead terminal 20 is additionally provided at the upper part of the electrode group 15, and this lead terminal 20 is welded with a lower face of the first sealing plate 19. A rubber based safety valve 21 is arranged so as to occlude a center hole 18 of the first sealing plate 19. Further, a hat-shaped positive electrode terminal 22 is welded with the first sealing plate 19 so as to cover the valve, and the electrode group is sealed.

In addition, at the upper part of the battery case thus structured, a press plate 23 of an insulation material having a center hole is arranged with only the positive electrode terminal 22 being extruded from the center hole. Further, an enclosure tube 24 is arranged to cover the periphery of the press plate 23 and the side face and bottom face of the battery case 11.

The battery according to the present invention is not limited to the above mentioned cylinder shape. For example, a rectangular battery may be structured such that the nickel electrode (positive electrode), separator, and hydrogen absorbing alloy electrode (negative electrode) are laminated each other to form a rectangular electrode group, and the electrode group is housed and sealed in a rectangular battery case.

The nickel electrode 12 of the electrode group 15 is generally manufactured as follows:

First, active substance powders consisting essentially of nickel oxides are mixed with a bonding agent such as a carboxymethyl cellulose, methyl cellulose, a sodium polyacrylic acid, polytetrafluoroethylene, or a hydropropylmethyl cellulose, the entirety is mixed by water to prepare a viscous paste. Elements such as Co, Cu, Zn, Al, Mn, Ca, Mg, Fe, or Si are solidly dissolved in nickel oxides employed.

Next, this paste is filled in and applied to a collector having its three-dimensional net-shaped structure such as a sponge-like nickel substrate, a net-shaped sintered metal fiber substrate, or a felt plating substrate in which nickel plating is applied to non-woven fabric. Thereafter, the paste is dried, and further, is pressurized and molded to make a positive electrode sheet of its predetermined thickness. At this time, as a collector, there can be employed a two-dimensional substrate such as a punched metal or expanded metal, 2.5-dimensional substrate whose structure has burring at an opening of the punched metal or the like.

When an active substance is employed in which a higher-order oxide of the above mentioned cobalt is formed on a surface of part or whole of the powders consisting essentially of nickel oxides, the assembled nickel-metal hydride secondary battery has improved self-discharge properties and improved charge and discharge cycle life performance by multiple action of the above separator.

Now, a preferred manufacturing method; of such active substance will be described.

First, as a starting material during manufacture of an active substance, there is provided granules in which particles consisting essentially of nickel hydroxides are charged in an alkali aquous solution controlled to pH11 to pH13, a cobalt sulfate aquous solution is gradually added thereto, whereby cobalt compounds such as cobalt hydroxides are deposited on a surface of the particles to cover the surface of the particles; or granules wherein particles made of cobalt metals, cobalt hydroxides, cobalt trioxides, tri-cobalt tetra-oxides, cobalt monoxides or a mixture of two or more kinds thereof are added to particles consisting essentially of nickel hydroxides.

In this case, the contents of the cobalt metals or cobalt compounds in the above granules are preferably set to within the range of 0.5 to 20% by weight. If the contents are less than 0.5% by weight, the aforementioned conductive matrix is insufficiently formed in a nickel electrode supporting the obtained active substance, and the utility of the active substance is not increased. If the contents are greater than 20% by weight, a relative rate of nickel hydroxide particles in the active substance decreases, and the battery discharge capacity is lowered.

First, the above mentioned granules are mechanically stirred in an alkali aquous solution, and the alkali aquous solution and granules are mixed uniformly.

As an alkali aquous solution at this time, there can be employed a sodium hydroxide aquous solution, a potassium hydroxide aquous solution, or a solution prepared by mixing a lithium hydroxide aquous solution with a mixture of these solutions.

At this time, the concentration of an alkali aquous solution is preferably set to within the range of 1 to 14N. If the concentration is lower than 1N, the solubility of the cobalt metals or cobalt compounds contained in granules becomes low, the aforementioned conductive matrix is formed insufficiently, and the utility of active substances is not increased so much. In addition, if the concentration is higher than 14N, the viscosity of the alkali aquous solution is increased, the alkali aquous solution does not permeate to the inside of the granules, whereby the cobalt metals or cobalt compounds cannot be dissolved sufficiently.

At this time, although the alkali aquous solution and granules may be mixed with each other and stirred under room temperature, the mixing and stirring may be carried out under heating conditions of about 35 to 110° C.

During a process for mixing and stirring the alkali aquous solution and granules, the alkali aquous solution is deposited uniformly on the surface of the granules, and permeates to the inside thereof. As a result, a part of the cobalt metals or cobalt compounds contained in the granules is dissolved in the alkali aquous solution.

For example, while the alkali aquous solution and granules are thus mixed with each other and stirred in an oxygen-containing atmosphere such as air, they are further mixed uniformly, and are irradiated with irradiation rays, preferably microwaves from magnetron for 20 minutes.

The microwave, when radiated to the mixture of the alkali aquous solution and the granules, serves to vibrate water molecules contained in the mixture and surrounding the individual particles, thereby uniformly heating the mixture, that is, the granules. The cobalt component dissolved in the alkali aquous solution is oxidized under the existence of oxygen, changes to conductive cobalt oxy-hydroxides, and is deposited on the surface of nickel oxide particles that are main components of the granules.

At this time, the heat treatment temperature of the mixture of the granules and alkali aqous solution is preferably set to 35 to 160° C. If the temperature is lower than 35° C., the cobalt metals or cobalt compounds contained in the granules are less dissolved in the alkali aquous solution, the conductive matrix is formed insufficiently, and the utility of active substances is not increased so much. In addition, if the temperature is higher than 160° C., a structural change of the nickel hydroxide particles itself takes place, and active substances deteriorates.

With respect to manufacture of active substances, although the above mentioned method is preferred, for example, there may be employed a method for synthesizing higher-order oxides of cobalt in advance and depositing the oxides on the surface of nickel hydroxide powders by a spattering method or the like.

Next, the negative electrode 14 is manufactured as follows: A paste having the hydrogen absorbing alloy powders, bonding agent, and, if required, a conductive material such as carbon black, for example, mixed with each other by water is filled in and applied to a collector, and then, is dried, and molded.

Any of the hydrogen absorbing alloys capable of electro-chemically absorbing and discharging hydrogen may be employed without being particularly limited. For example, there can be exemplified a multiple element system in which $LaNi_5$, $MmNi_6$ (Mm denotes a misch metal), $LmNi_5$ (Lm denotes a lanthanum enriched misch metal), or one part of Ni is substituted by Al, Mn, Co, Ti, Cu, Zn, Zr, Cr, B or the like; TiNi system, TiFe system, MgNi system or a mixture system thereof. In particular, the hydrogen absorbing alloys represented by the formula; $LmNi_xAl_yA_x$ ('A' denotes at least one kind selected from Al and Co, and x, y, and z denote an atom ratio meeting $4.8 \leq x+y+z \leq 5.4$) is preferred in that fine particulate during a charge and discharge cycle is restricted, and the battery charge and discharge cycle life performance can be improved.

In addition, the bonding agent includes the polymeric materials employed during manufacture of a nickel electrode 12. The collector includes, for example, a two-dimensional substrate such as a punched metal, an expanded metal, a punched steel plate, or a nickel net or a three-dimensional net-shaped structure such as a felt-shaped metal porous body or a sponge-like metal substrate.

EXAMPLES 1 TO 12 AND COMPARATIVE EXAMPLES 1 TO 4

1. Manufacture of Separator

From long fibers of 10 μm in average diameter or continuous fibers constituting a polypropylene resin, non-woven fabric of 50 g/m$^2$ in basis weight, 0.16 mm in thickness, 10 cm in width, and 10 cm in length was fabricated by a span bond method. This non-woven fabric was dried at 80° C. for 30 minutes, and water adhered to the non-woven fabric was removed. Under room temperature, a specific surface area was measured by a nitrogen BET 1 point method. The specific surface area was 1.7 m$^2$/g.

The non-woven fabric was arranged on an earth electrode of the plasma treatment apparatus (the earth electrode and the power electrode are 90 mm in diameter, and a distance between these electrodes is 40 mm) shown in FIG. 1, and the internal pressure of a closed container was reduced to about 10$^{-6}$ Torr. Then, an oxygen gas of 99.9% in impurity was supplied at a flow rate of 30 ml/min, and the internal pressure of the container was adjusted to 13.3 Pa. In other samples, a nitrogen gas of 99.9% in purity or an argon gas of 99.9% in purity was introduced under the similar conditions to the above instead of the oxygen gas.

Next, plasma treatment was carried out at a frequency of 13.56 Hz and at a power (W) and processing time shown in Table 1, the internal pressure is reset to an atmospheric pressure, the non-woven fabric was removed, and cut out in the shape of a strap of 100 mm in length and 40 mm in width to make a separator.

In Example 11, a separator of predetermined type shown in Table 1 was manufactured from polypropylene resin fibers using a melt blow method. In Example 12, the separator of predetermined type shown in Table 1 was manufactured from complex fibers of polypropylene and polyethylene resins using a dry-type method.

2. Manufacture of the Positive Electrode

Powders consisting of nickel hydroxide-powders of 90 parts by weight and cobalt oxide powders of 5.5 parts by weight were mixed with each other. A sodium polyacrylic acid of 0.14 parts by weight, a hydroxypropyl methyl cellulose of 0.05 parts by weight, a carboxy methyl cellulose of 0.1 parts by weight, PTFE dispersion (specific gravity 1.5 and solid component of 60% by weight) of 0.6 parts by weight (conversion of the solid component), and pure water of 2.7 parts by weight were added to nickel hydroxide powders of 90 parts by weight and mixed with the above mixture to make a paste.

This paste was first filled in and applied to cavities of a nickel plated substrate foam, and further, the paste was applied and dried on the substrate surface. Next, this substrate was roller-pressed and rolled to make a positive electrode (a nickel electrode).

3. Manufacture of the Negative Electrode

Commercially available Lm, Ni, Co, Mn, and Al were mixed with each other, and heated and fused by a high-frequency furnace, and a hydrogen absorbing alloy ingot of $LmNi_{4.0}Co_{0.4}Mn_{0.3}Al_{0.3}$ in composition was fabricated. This ingot was mechanically milled, and powders under 200 meshes (Tyler screen) were obtained.

To these powders of 100 parts by weight, there were added and mixed a sodium polyacrylic acid of 0.3 parts by weight, a carboxy methyl cellulose of 0.05 parts by weight, PTFE dispersion (specific gravity of 1.5 and solid component of 60% by weight) of 1.0 parts by weight (conversion of the solid component), carbon powders (conductive material) of 1.0 parts by weight, and pure water of 44 parts by weight to make a paste.

This paste was applied to a nickel plated steel plate based punched metal, and the paste was dried. Then, the substrate was roller-pressed and rolled to make a negative electrode (a hydrogen absorbing alloy electrode).

4. Battery Assembly

A plasma treated separator was intervened between the above negative and positive electrodes, and was spirally wound with the negative electrode being outside thereof to make an electrode group, and the electrode group was housed in a battery case. Then, an alkali electrolyte consisting of a KOH aquous solution of 7N and a LiOH aquous solution of 1N was injected in a battery case, and was sealed, and then, a cylindrical nickel-metal hydride secondary battery of AAA size was assembled.

5. Measurement of Contact Angle

Each separator of 2.5 cm in length and 5 cm in width was horizontally placed, a pure water of 10 μL was dropped at 5 sites with intervals of 1 cm, and an average value of a contact angle after an elapse of 1 minutes was obtained. Measurement was carried out by a goniometer type contact angle measuring instruments. The contact angle in each embodiment is shown in Table 1.

The smaller value of the contact angle denotes superior hydrophilicity.

6. Evaluation of Self-discharge Properties

The above battery was charged at 0.2 ° C. and 150% with respect to a nominal capacity at 20° C., and then charging and discharging were repeated by 3 cycles, 1 cycle of which was defined as discharging carried out until the battery voltage had reached 1.0 V at 1 C. At this time, a discharge capacity (residual capacity) obtained from the current value during discharge and the time required for discharge was defined as $C_O$.

Then, the battery was stored in a 45° C. thermostat vessel for 14 days in a state in which 150% discharging was carried out at 0.2 C.

Then, discharging were carried out until the battery voltage had reached 1.0 V at 1 C. At this time, the discharge capacity (residual capacity) was defined as $C_R$.

The capacity residual ratio (%) was calculated as $(C_R/C_O) \times 100$.

Figure 9:
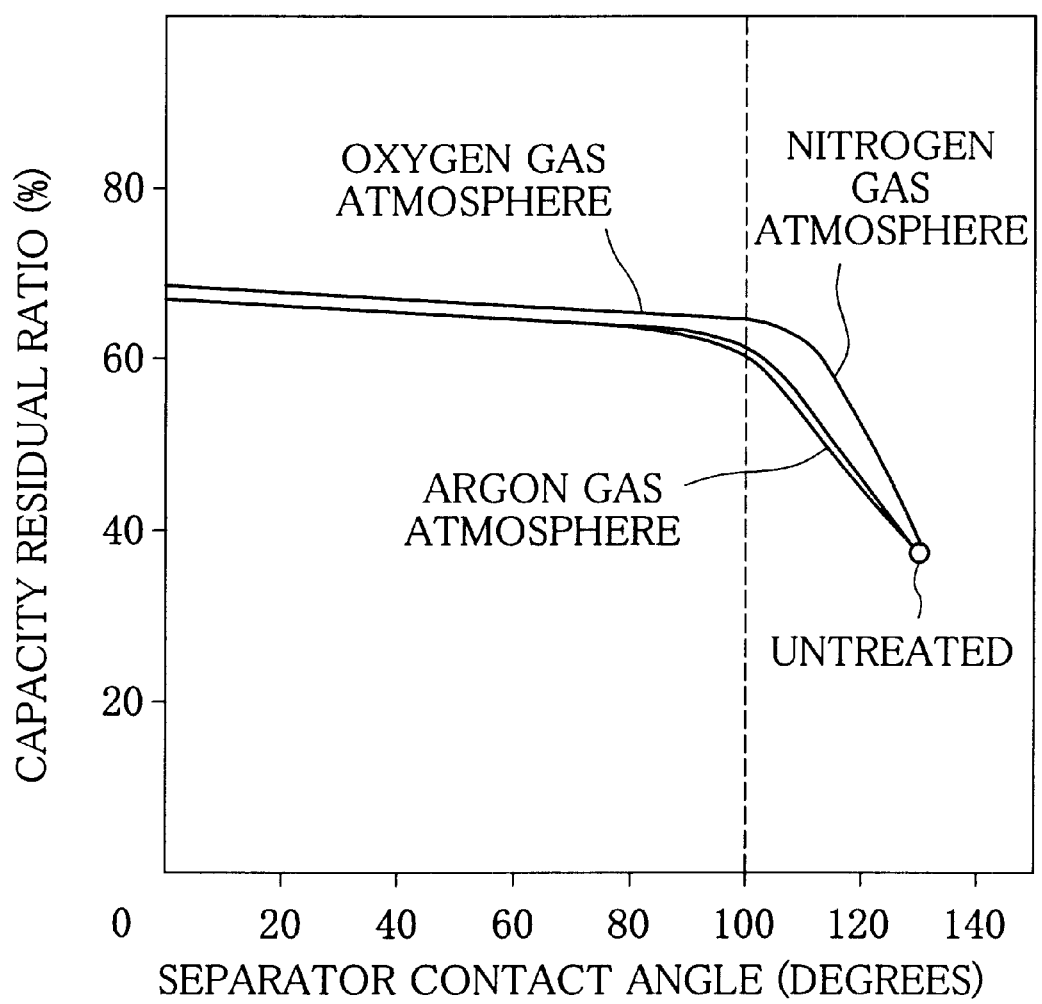
FIG. 9 is a graph depicting a relationship between a separator contact angle and a capacity residual ratio (%) in a nickel-metal hydride secondary battery employed for the present invention and comparison.

In FIG. 9, there is shown the capacity residual ratio (%) with respect to the contact angle of the separator in the case where the atmospheric gas for plasma treatment were changed to oxygen, nitrogen, and argon with respect to each Example. In the figure, an open circle denotes a relationship between the separator and the contact angle when plasma treatment is not performed.

In FIG. 9, the upper position denotes the superior self-discharge properties.

TABLE 1

| | Separator type | | | | | | Contact angle of separator after plasma treatment ($\Omega$) |
|---|---|---|---|---|---|---|---|
| | Fiber diameter ($\mu$m) | Basis weight (g/m$^2$) | Thickness (mm) | Specific surface area (m$^2$/g) | Plasma treatment | | |
| | | | | | Treatment conditions (electric power, time) | Atmospheric gas | |
| Example 1 | 10 | 50 | 0.16 | 1.7 | 50 W, 5 minutes | Oxygen | 0 |
| Example 2 | " | " | " | " | 50 W, 1 minute | " | 24 |
| Example 3 | " | " | " | " | 15 W, 1 minute | " | 57 |
| Example 4 | " | " | " | " | 15 W, 30 seconds | " | 98 |
| Example 5 | " | " | " | " | 50 W 10 minutes | Nitrogen | 23 |
| Example 6 | " | " | " | " | 50 W, 5 minutes | " | 66 |
| Example 7 | " | " | " | " | 15 W, 30 seconds | " | 91 |
| Example 8 | " | " | " | " | 50 W, 10 minutes | Argon | 45 |
| Example 9 | " | " | " | " | 50 W, 5 minutes | " | 79 |
| Example 10 | " | " | " | " | 15 W, 30 seconds | " | 98 |
| Example 11 | 1 | 40 | 0.18 | 5.5 | 15 W, 30 seconds | Nitrogen | 96 |
| Example 12 | 25 | 60 | 0.18 | 0.4 | 50 W, 5 minutes | " | 97 |
| Comparative Example 1 | 10 | 50 | 0.16 | 1.7 | — | — | 130 |
| Comparative Example 2 | " | " | " | " | 15 W, 5 seconds | Oxygen | 112 |
| Comparative Example 3 | " | " | " | " | 15 W, 5 seconds | Nitrogen | 113 |
| Comparative Example 4 | " | " | " | " | 15 W, 5 seconds | Argon | 113 |

The following is evident from Table 1 and FIG. 9.
(1) A battery according to the present invention maintains its predetermined capacity residual ratio.
(2) In the case of Comparative Example 1 wherein plasma treatment is not applied and Comparative Examples 2 to 4 wherein plasma treatment is insufficient, the capacity residual ratios are lowered more significantly than those in Examples. From the foregoing, it is effective that the contact angle of the separator is set to 0 to 100 degrees to pure water, and the superiority of the present invention in which plasma treatment is applied to the separator is evident.
(3) As is evident in comparing Example 1, Example 6 and Example 9 wherein plasma treatments were applied using the same treatment conditions, in Example 1, the contact angle of the separator is smaller, and the capacity residual ratio is superior to those in Examples 6 and 9. This fact indicates the superiority that plasma treatment is carried out in an atmosphere containing the separator. This is because a hydrophilic group having highly hydrophilic oxygen atoms is introduced into fibers in an atmosphere containing oxygen, while there is higher possibility that a hydrophilic group having nitrogen atoms is introduced into fibers to cause shuttle reaction in an atmosphere containing nitrogen or argon gas.
(4) In the case of Example 12 wherein a specific surface area of non-woven fabric constituting the separator is less than 0.5 m$^2$/g, a contact angle of the separator is increased than that in Example 6 wherein plasma treatment is applied under the same treatment conditions. On the other hand, in the case of Example 11 wherein the specific surface area is 5 m$^2$/g, a part of the separator is slightly damaged when it is wound around an electrode group. From the foregoing, it is found that the specific surface area of the non-woven fabric constituting the separator is preferably set to 0.5 to 5.0 m$^2$/g.

In the above Examples, although a case in which plasma treatment is applied has been described, if the contact angle of the separator is within the above range, it is observed that the similar effect is achieved when acrylic acid graft treatment, sulphonation treatment, or fluoridation treatment is applied.

Further, in the above Examples, although a cylindrical nickel-metal hydride secondary battery has been described, the present invention is applicable to a rectangular nickel-metal hydride secondary battery, similarly.

EXAMPLES 13 TO 15 AND COMPARATIVE EXAMPLES 5 TO 8

(1) Manufacture of Separator

A non-woven fabric of 50 g/m$^2$ in basis weight and 0.16 mm in thickness was fabricated with a Span Bond method using polypropylene fibers of 10 $\mu$m in average of fiber diameter. This separator was defined as separator material (1).

A non-woven fabric of 40 g/m$^2$ in basis weight and 0.18 mm in thickness was fabricated with a Melt Blow method using polypropylene fibers of 1 $\mu$m in average of fiber diameter. This separator was defined as separator material (2).

Further, a dry-type non-woven fabric of 60 g/m$^2$ in basis weight and 0.18 mm in thickness was fabricated using complex fibers consisting of polypropylene fibers and polyethylene fibers each of 25 $\mu$m in average fiber diameter. This is defined as separator (3).

These non-woven fabrics are arranged between electrodes of the plasma treatment apparatus, and 1-hour pressure-reducing operation was carried out. Thereafter, a gas indicated in the apparatus was flown herein at a flow rate of 30 ml/min, plasma treatment was carried out under the conditions shown in Table 2 with the inside of the apparatus being adjusted to 0.1 Torr, and various separators were manufactured.

Each separator after the treatment was heated at a temperature of 80° C. for 30 minutes, and then, a specific surface area therefor was measured with BET 1 point method using nitrogen. The results are shown in Table 2. In addition, the contact angle of each separator was measured, and the measurement values are shown in Table 2.

TABLE 2

| | Type of separator employed | Plasma treatment conditions | Specific surface area (m²/g) | Contact angles (Ω) |
|---|---|---|---|---|
| Separator A | Separator material (1) | Treatment was carried out at a frequency of 13.56 KHz and at an output of 50W for 10 minutes using a mixture gas of oxygen gas (partial pressure: 80%) and tetra-fluorinated carbon (partial pressure 20%). | 1.7 | 0 |
| Separator B | Separator material (1) | Treatment was carried out at a frequency of 13.56 KHz and at an output of 50W for 10 minutes using a mixture gas of nitrogen gas (partial pressure: 80%) and tetra-fluorinated carbon (partial pressure: 20%). | 1.7 | 28 |
| Separator C | Separator material (1) | Hydrophilization treatment was carried out at a frequency of 13.56 KHz and at an output of 50W for 10 minutes using oxygen gas, and then, hydrophobilization treatment was carried out at a frequency of 13.56 KHz and at an output of 15W for 30 seconds using tetra-fluorinated carbon. | 1.7 | 16 |
| Separator D | Separator material (1) | No plasma treatment | 1.7 | 130 |
| Separator E | Separator (1) | Only hydrophilization treatment was carried out at a frequency of 13.56 KHz and at an output of 50W for 10 minutes using oxygen gas. | 1.7 | 0 |
| Separator F | Separator material (2) | Treatment was carried out at a frequency 13.56 KHz and at an output of 50W for 10 minutes using a mixture gas of oxygen gas (partial pressure: 80%) and tetra-fluorinated carbon (partial pressure: 20%). | 5.5 | 0 |
| Separator G | Separator material (3) | Treatment was carried out at a frequency 13.56 KHz and at an output of 50W for 10 minutes using a mixture gas of oxygen gas (partial pressure: 80%) and tetra-fluorinated carbon (partial pressure: 20%) | 0.4 | 0 |

(2) Manufacture of Battery

Cobalt oxide powders of 6.1 parts by weight, a sodium polyacrylic acid of 0.16 parts by weight, a hydroxy methyl cellullose of 0.06 parts by weight, a carboxy methyl cellulose of 0.11 parts by weight, and PTFE dispersion (specific gravity of 1.5 and solid content of 60% by weight) of 0.67 parts by weight were mixed with each other to nickel hydroxide powders of 100 parts by weight. Further, pure water of 30 parts by weight are added, the entirety was mixed, and a paste was prepared.

This paste was filled in nickel foam substrate, was dried, and was rolled, and a nickel electrode (a positive electrode) of 0.6 mm in thickness was manufactured.

On the other hand, a hydrogen absorbing alloy of $LmNi_{4.0}Co_{0.04}Mn_{0.3}Al_{0.3}$ in composition ('Lm' denotes a La enriched misch metal) was mechanically milled, and powders under 200 meshes (Tyler screen) were obtained.

Then, a sodium polyacrylic acid of 0.3 parts by weight, a carboxy methyl cellulose of 0.05 parts by weight, a carbon black of 1.0 parts by weight, and PTFE dispersion (specific gravity: 1.5 and solid content: 60% by weight) of 1.0 parts by weight were blended to the powders of 100 parts by weight, the entirety was mixed by water of 44 parts by weight, and a paste was prepared.

This paste was applied to a nickel punched metal (opening rate of 45%), was dried, and further, was rolled, and a hydrogen absorbing alloy electrode (a negative electrode) in 0.3 mm in thickness was fabricated.

Between these nickel electrode and hydrogen absorbing alloy electrode, as shown in Table 3, each separator of Table 2 was sandwiched to make a laminate sheet, the hydrogen absorbing alloy electrode was externally wound, and various electrode groups 15 shown in FIG. 8 was fabricated.

Separator F was damaged during winding, and an electrode could not fabricated.

Then, this electrode group 15 is employed, a mixture solution made of KOH of 7N and LiOH 1N of 1N was employed as an electrolyte, and a nickel-metal hydride secondary battery of AAA size shown in FIG. 8 was manufactured.

TABLE 3

| | Type of separator incorporated |
|---|---|
| Example 13 | Separator A |
| Example 14 | Separator B |
| Example 15 | Separator C |
| Comparative Example 5 | Separator D |
| Comparative Example 6 | Separator E |
| Comparative Example 7 | Separator F |
| Comparative Example 8 | Separator G |

(3) Battery Properties

Each of the obtained batteries was charged at 0.2 C and 150% with respect to nominal capacity at a temperature of 20° C., and then, three charge and discharge cycles were repeated until the battery voltage reached 1.0 V at 1 C. Thereafter, 150% discharging was carried out at 0.2 C, the battery was stored in a thermostat vessel of 45° C. in temperature. After the storage, discharging was carried out until the battery voltage was 1.0 V at 1 C, and the residual capacity was measured.

When the battery nominal capacity was assumed to be $C_0$, and the above residual capacity was assumed to be $C_1$, the capacity residual ratio of each battery was calculated based on the following formula: $100 \times C_1/C_0$ (%). The results are shown in FIG. 10.

Figure 10:
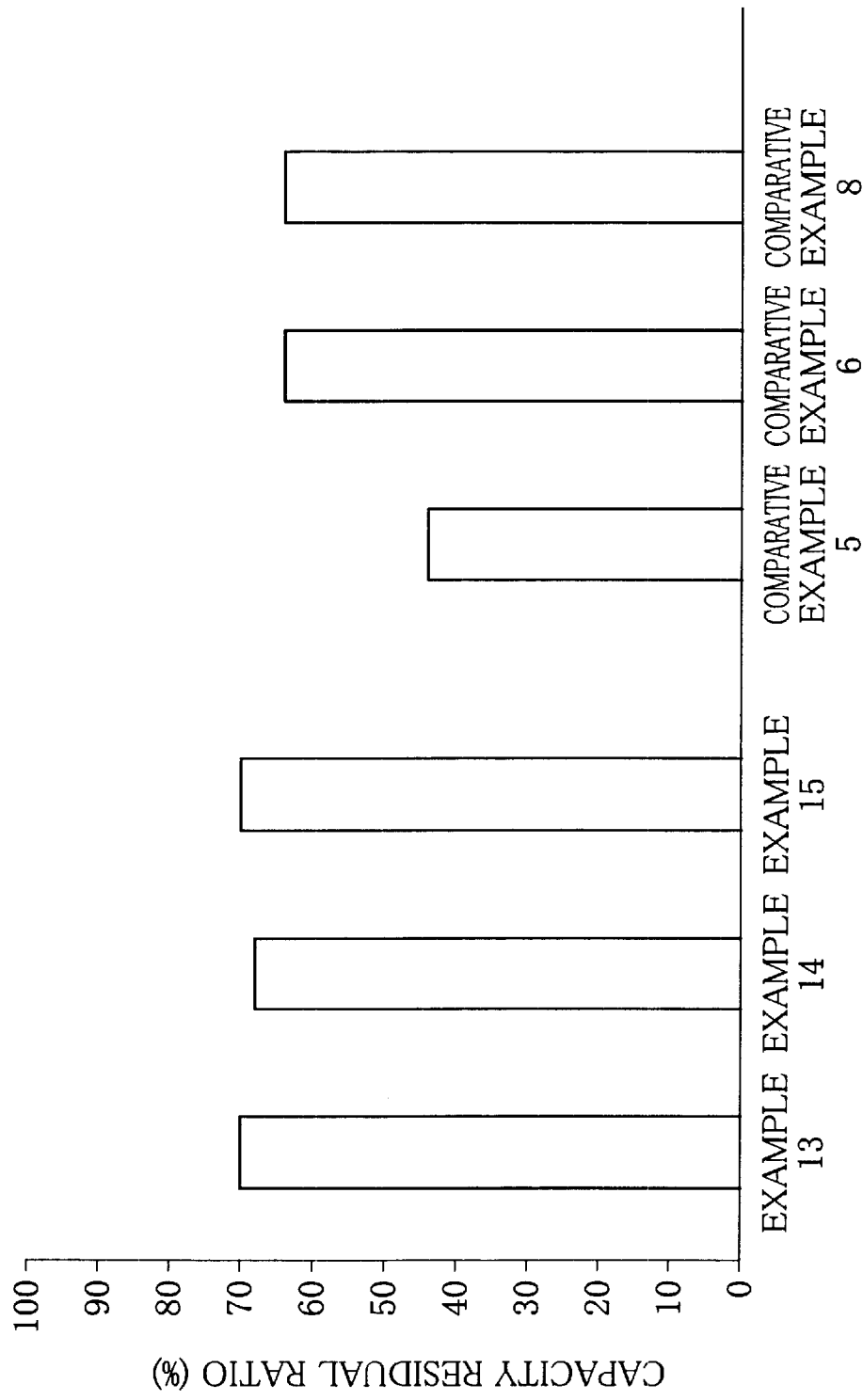
FIG. 10 is a graph depicting the capacity residual ratio of each battery in Examples 13 to 15 and Comparative Examples 5 to 8.

From FIG. 10, the following facts are evident. 1) In all of the cases of Examples 13 to 15 and Comparative Example 8 wherein hydrophilization treatment and hydrophobilization treatment were carried out and in the case wherein only hydrophilization treatment was carried out (Comparative Example 6), the capacity residual ratios were increased more significantly than that in the case where plasma treatment was not carried out (Comparative Example 5), and an improvement in self-discharge properties was observed. 2) However, in the case of Comparative Example 6, the capacity residual ratio is lower than that in Examples 13 to 15. From the foregoing, it is evident that plasma treatment for carrying out both of hydrophilization and hydrophobilization is more advantageous than plasma treatment for hydrophilization only. 3) In addition, in the case of separator F whose specific surface area is as large as 5.5 m²/g, an electrode group cannot be manufactured due to damage, and the capacity residual ratio of a battery using separator G whose specific surface area is 0.5 $m^2/g$ is low. From the foregoing, it is found that a separator whose specific surface area is 0.5 to 5.0 $m^2/g$ is preferably employed.

EXAMPLES 16 AND 17 AND COMPARATIVE EXAMPLES 9 AND 10

(1) Manufacture of Separator

The following separator was manufactured using the apparatus shown in FIG. 1.

First, a non-woven fabric of 50 $g/m^2$ in basis weight and 0.16 mm in thickness was manufactured with a Span Bond method using polypropylene fibers of 10 $\mu$m in average fiber diameter.

This non-woven fabric was cut in the shape of a square of 120 mm in length ($L_1$) and 120 mm in length ($L_2$).

Figure 11:
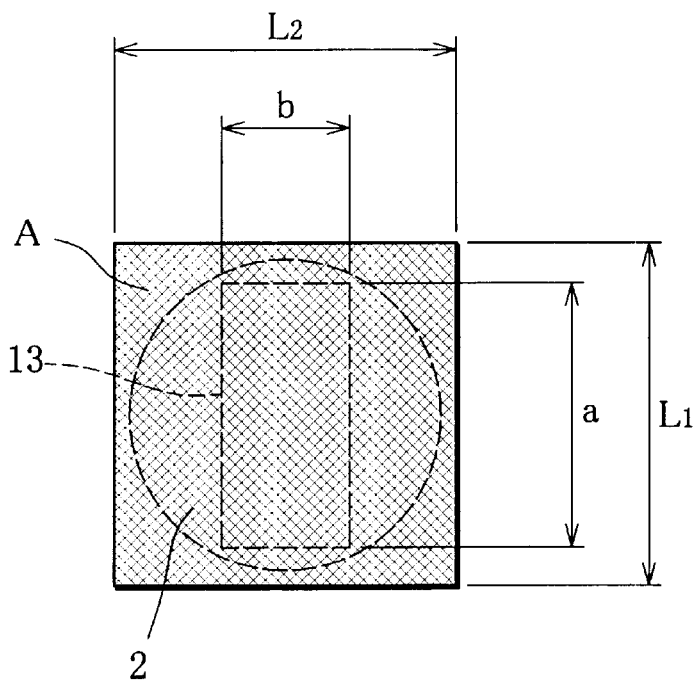
FIG. 11 is a plan view showing a state in which a separator material is arranged during manufacture of separator H according to Example 16.

This non-woven fabric was arranged on an earth electrode 2 of 110 mm in diameter, as shown in FIG. 11. That is, in this case, the entire surface 2a of the earth electrode 2 was covered with the non-woven fabric.

A pressure reducing process was carried out for a closed container 1 for 1 hour, an oxygen gas was supplied therein from a gas supply mechanism 6 at a flow rate of 30 ml/min and the inside of the container was adjusted to 0.1 Torr. Then, 5-minute plasma treatment was carried out at a radio frequency of 13.56 kMz and at 50 W in output of an power electrode 3.

After a treated material has been removed from the apparatus, both ends thereof are cut, and a separator in the shape of a strap of 100 mm in length (a) and 40 mm in width (b) was formed as shown in FIG. 11. This is defined as separator H. The contact angle was 0 degrees.

Figure 12:
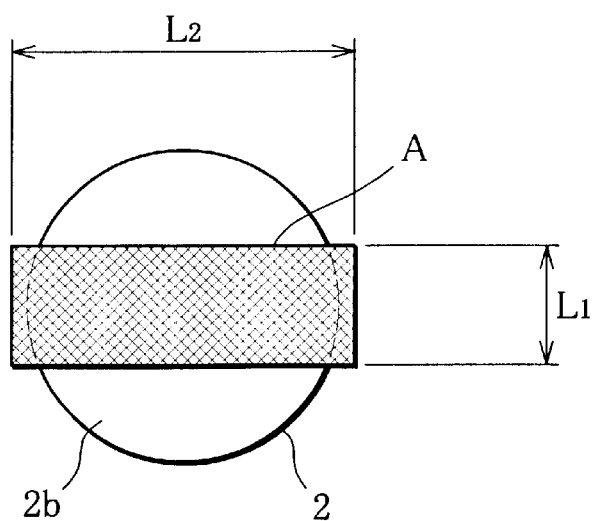
FIG. 12 is a plan view showing a state in which a separator material is arranged during manufacture of separator H according to Example 17.

Plasma treatment was carried out under the conditions similar to those in the case of separator H, except that the aforementioned non-woven fabric was cut in the shape of a strap of 40 mm in width ($L_1$) and 100 m in length ($L_2$), the cut cloth was placed on the earth electrode 2 of 110 mm in diameter, as shown in FIG. 12, and an exposed surface of the earth electrode was completely covered with a polypropylene film. The thus obtained separator was defined as separator I. The contact angle was 0 degrees.

Unlike in the case of separator I, plasma treatment was carried out for the exposed surface of the earth electrode without the polypropylene film, and a separator was manufactured. This separator was defined as separator J. The contact angle was 0 degrees.

The strap-shaped non-woven fabric was provided as a separator. The separator was defined as separator K. The contact angle was 130 degrees.

(2) Manufacture of Battery

A nickel electrode (a positive electrode) and a hydrogen absorbing alloy electrode (a negative electrode) was manufactured using the conditions similar to those in Examples 13 to 15.

Between these nickel electrode and hydrogen absorbing alloy electrode, as shown in Table 4, each of the above mentioned separators is sandwiched to make a laminate sheet. Thereafter, the hydrogen absorbing alloy electrode was externally wound, and various electrode groups 15 shown in FIG. 8 were manufactured.

TABLE 4

|  | Type of separator incorporated |
| --- | --- |
| Example 16 | Separator H |
| Example 17 | Separator I |
| Comparative Example 9 | Separator J |
| Comparative Example 10 | Separator K |

These electrode groups 15 were employed, a mixture solution made of KOH of 7N and LiOH of 1N was employed as an electrolyte, and a nickel-metal hydride secondary battery of AAA size having a structure shown in FIG. 8 was manufactured.

(3) Battery Properties

The capacity residual ratio was measured under the same conditions as those in Examples 13 to 15. The results are shown in FIG. 13.

Figure 13:
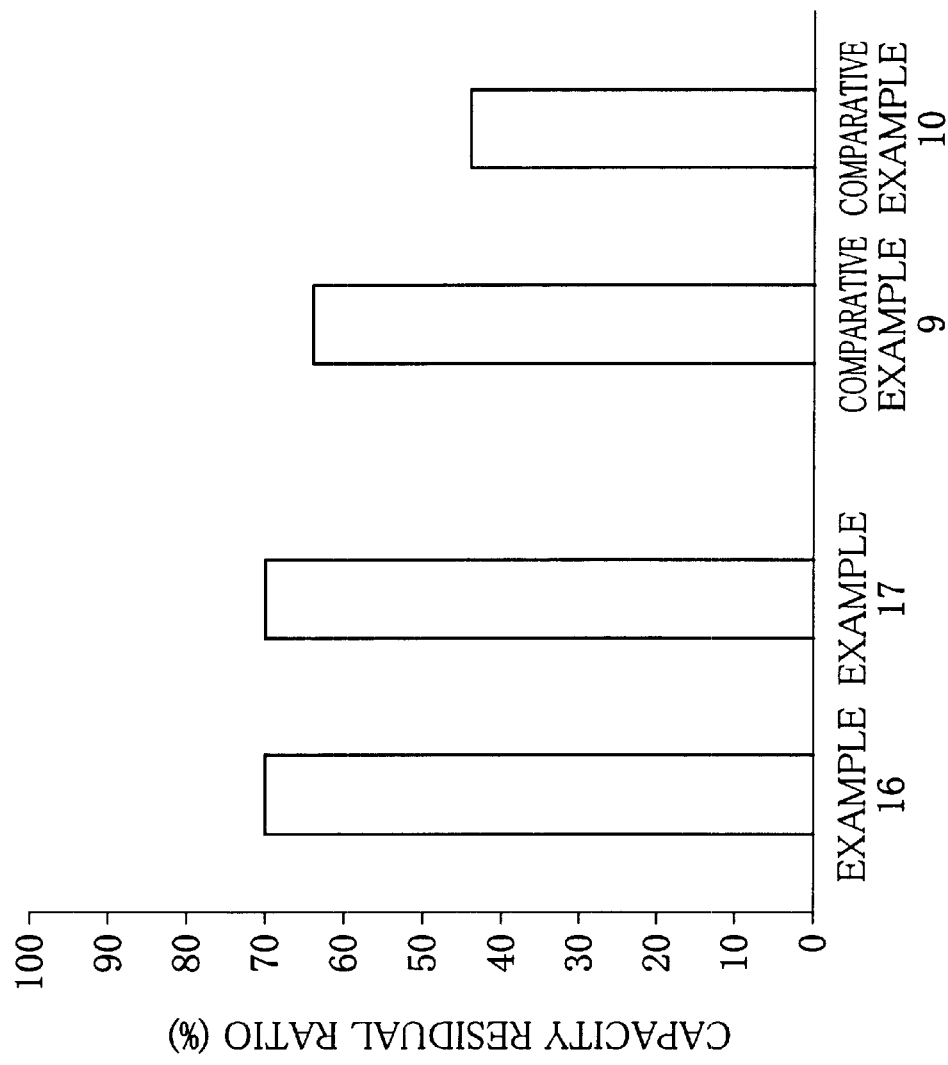
FIG. 13 is a graph depicting the capacity residual ratio of each battery according to Examples 16 and 17 and Comparative Examples 9 and 10.

From FIG. 13, the following points are evident. 1) In all of Examples 16 and 17 and Comparative Example 9 wherein hidrophilization treatment is carried out by plasma treatment, the capacity residual ratio is improved more significantly than in the case where the above treatment is not carried out (Comparative Example 10), and an improvement in self-discharge properties at a high temperature is observed. 2) However, in the case of Comparative Example 9, the capacity residual ratio is lower than in the case of Examples 16 and 17. From the foregoing, when plasma treatment is carried out, the usefulness of which the earth electrode surface is not exposed is evident.

EXAMPLES 18 TO 20 AND COMPARATIVE EXAMPLES 11 AND 12

(1) Manufacture of Separator

The following separator was manufactured using the apparatus shown in FIG. 1.

First, a non-woven fabric of 5 $g/m^2$ in basis weight and 0.16 mm in thickness was manufactured with a Span Bond method using polypropylene fibers of 10 $\mu$m in average fiber diameter.

This non-woven fabric was cut in a square of 120 mm in length and 120 mm in length.

The non-woven fabric was arranged on the earth electrode 2 of 110 mm in diameter as shown in FIG. 11. That is, in the case, the entire surface of the earth electrode 2 was covered with the above non-woven fabric.

1-hour pressure-reducing treatment was carried out in a closed container 1, an oxygen gas was supplied therein from a gas supply mechanism 6 at a flow rate of 30 ml/min, and the inside of the container was adjusted to 0.1 Torr. Then, 5-minute plasma treatment was carried out at a radio frequency of 13.56 kHz and at an output of 50 W in power electrode 3.

The thus treated material was removed from the apparatus, both ends thereof were cut, and a separator in the shape of a strap of 40 mm in width and 100 mm in length was formed. This separator was defined as separator L. The contact angle was 0 degrees.

Next, plasma treatment was carried out in a manner similar to that in the case of separator L except that the aforementioned non-woven fabric was cut in the shape of a strap of 40 mm in width and 100 mm in length, and the cut cloth was arranged between the earth electrode 2 and the power electrode 3 with the cloth being inclined by an angle (θ) of 20 degrees relative to the surface of the earth electrode 2 of 110 mm in diameter, as shown in FIG. 4. The thus obtained separator was defined as separator M. The contact angle was 0 degrees.

In addition, the strap-shaped non-woven fabric employed for manufacture of separator M is placed on the earth electrode 2 of 110 mm in diameter. Further, on the center portion thereof, as shown in FIG. 3, plasma treatment was carried out in a manner similar to that in the case of separator L except that the same type of non-woven fabrics of 40 mm in diameter were laminated and arranged. The thus obtained separator was defined as separator N.

Plasma treatment was carried out in a manner similar to that in the case of separator L except that the strap-shaped non-woven fabric employed for manufacture of separator M was placed on the earth electrode of 110 mm in diameter. In this case, since the size of non-woven fabric to be treated is smaller than the surface size of the earth electrode, the full surface of the non-woven fabric is uniformly plasma-treated. The separator thus obtained was defined as separator O. The contact angle was 0 degrees. Also, separator P was prepared using the aforementioned strap-shaped non-woven fabric. The contact angle was 130°.

(2) Manufacture of Battery

A nickel electrode (a positive electrode) and a hydrogen absorption electrode (a negative electrode) were manufactured using the conditions similar to those in Examples 13 to 15.

Between these nickel electrode and hydrogen absorbing alloy electrode, as shown in Table 5, each of the above mentioned separators is sandwiched to make a laminate sheet, and the hydrogen absorbing alloy electrode was externally wound, and various electrode groups 15 shown in FIG. 8 were manufactured.

TABLE 5

|  | Type of separator incorporated |
| --- | --- |
| Example 18 | Separator L |
| Example 19 | Separator M |
| Example 20 | Separator N |
| Comparative Example 11 | Separator O |
| Comparative Example 12 | Separator P |

These electrode groups 15 were employed, a mixture solution made of KOH of 7H and LiOH of 1N was employed as an electrolyte, and a nickel-metal hydride secondary battery of AAA size having a structure shown in FIG. 8 was manufactured.

(3) Battery Properties

The capacity residual ratio was measured under the same conditions as those in the case of Examples 13 to 15. The results are shown in FIG. 14.

Figure 14:
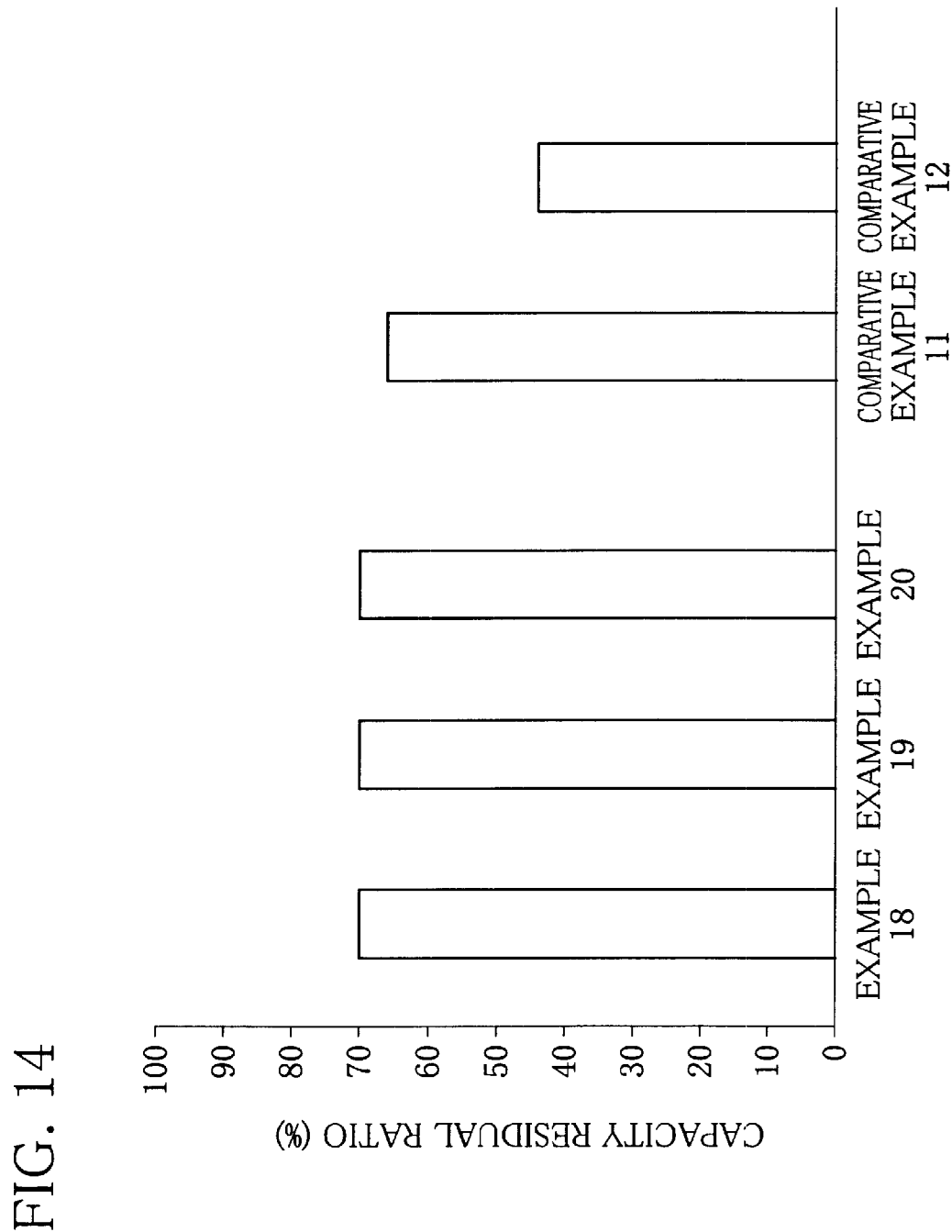
FIG. 14 is a graph depicting the capacity residual ratio of each battery according to Examples 18 to 20 and Comparative Examples 11 to 12.

From FIG. 14, the following points are evident.
1) In all of Examples 18 to 20 and Comparative Example 11 each using a separator in which hydrophilization treatment is carried out by plasma treatment, the capacity residual ratios are increased more significantly than that in the case of using a separator in which the above treatment is not carried out (Comparative Example 12), and an improvement of self-discharge properties at a high temperature is observed.
2) However, in the case of Comparative Example 11 using a separator whose full surface is uniformly plasma-treated, the capacity residual ratio is lower than that in the case of Examples 18 to 20. From the foregoing, when plasma treatment is carried out, the usefulness of which plasma treatment is carried out so as to produce a certain difference in hydrophilicity is evident.

EXAMPLE 21 AND COMPARATIVE EXAMPLES 13 TO 15

The following separator was manufactured using the apparatus shown in FIG. 1.

First, a non-woven fabric of 50 cm/m$^2$ in basis weight and 0.16 mm in thickness was manufactured with a Span Bond method using polypropylene fibers of 10 μm in average fiber diameter.

This non-woven fabric was cut in a square of 100 mm in length and 100 mm in width.

The non-woven fabric was arranged on an earth electrode 2 of 90 mm in diameter. That is, in this case, the entire surface of the earth electrode 2 is covered with the above non-woven fabric.

1-hour pressure-reducing treatment was carried out in a closed container 1, an oxygen gas was supplied therein from a gas supply mechanism 6 at a flow rate of 30 ml/min, and the inside of the container was adjusted to 13.3 Torr. Then, 5-minute plasma treatment was carried out at a radio frequency of 13.56 kHz and at an output of 50 W in power electrode 3.

The material thus treated was removed from the apparatus, both ends thereof were cut, and a strap-shaped separator of 40 mm in width and 100 mm in length were formed. This separator were defined as a separator Q. The contact angle was 0 degrees.

In addition, the aforementioned, strap-shaped non-woven fabric was provided as a separator. This separator was defined as separator R. The contact angle was 130 degrees.

(2) Manufacture of Nickel Electrode

Cobalt hydroxide powders of 1 μm in average particle size were mixed with each other by 11.1 parts by weight to nickel hydroxide powders of 10 μm in average particle size of 100 parts by weight. After the mixed powders were charged into a flow granulation apparatus, while the entirety was stirred, a sodium aquous solution of 12N was added herein. At the same time, microwaves were irradiated from a magnetron apparatus, 20-minute heat treatment was carried out at a temperature of about 100° C., and an active substance was formed.

To this active substance of 100 parts by weight, there were added and mixed a sodium polyacrylic acid of 0.16 parts by weight, a hydroxy methyl cellulose of 0.06 parts by weight, a carboxy methyl cellulose of 0.11 parts by weight, and PTFE dispersion (specific gravity: 1.5 and solid content: 60% by weight) of 0.67 parts by weight. Further, pure water of 30 parts by weight were added, the entirety was mixed, and a paste was prepared.

This paste was filled in a nickel foam substrate, was dried, and rolled, and a nickel electrode of 0,6 mm in thickness was manufactured. This electrode is defined as nickel electrode A.

On the other hand, another nickel electrode was manufactured in a manner similar to that of the nickel electrode A except that the above mentioned mixture powders were employed without the above mentioned heat treatment. This electrode was defined as nickel B.

(3) Battery Assembly

On the other hand, a hydrogen absorbing alloy of $LmNi_{4.0}Co_{0.0}4Mn_{0.3}Al_{0.3}$ (Lm denotes a La enriched misch metal) in composition was mechanically milled, and powders under 200 meshes (tyler screen) were obtained.

Then, to these powders of 100 parts by weight, there were blended a sodium polyacrylic acid of 0.3 parts by weight, a carboxy methyl cellulose of 0.05 parts by weight, a carbon black of 1.0 parts by weight, and PTFE dispersion (specific gravity: 1.5 and solid content: 60% by weight) of 1.0 parts by weight with each other, the entirety was mixed by water of 44 parts by weight, and a paste was prepared.

This paste was applied to a nickel punched metal (opening rate: 45%), was dried, and further, was rolled, and a hydrogen absorbing alloy electrode (a negative electrode) of 0.3 mm in thickness was manufactured.

Between these nickel electrode and hydrogen absorbing alloy electrode, as shown in Table 6, each of the above mentioned separators was sandwiched to make a laminate sheet. Thereafter, the hydrogen absorbing alloy electrode was externally wound, and various electrode groups 15 shown in FIG. 8 were manufactured.

TABLE 6

|  | Nickel electrode employed | Separator employed |
| --- | --- | --- |
| Example 21 | Nickel electrode A | Separator Q |
| Comparative Example 13 | Nickel electrode A | Separator R |
| Comparative Example 14 | Nickel electrode B | Separator Q |
| Comparative Example 15 | Nickel electrode B | Separator R |

These electrode groups 15 were employed, a mixture solution made of KOH of 7N and LiOH of 1N was employed as an electrolyte, and a nickel-metal hydride secondary battery of AAA size having a structure shown in FIG. 8 was manufactured.

(4) Battery Properties

The capacity residual ratio was measured under the same conditions as those in the case of Examples 13 to 15. The results are shown in FIG. 15.

Figure 15:
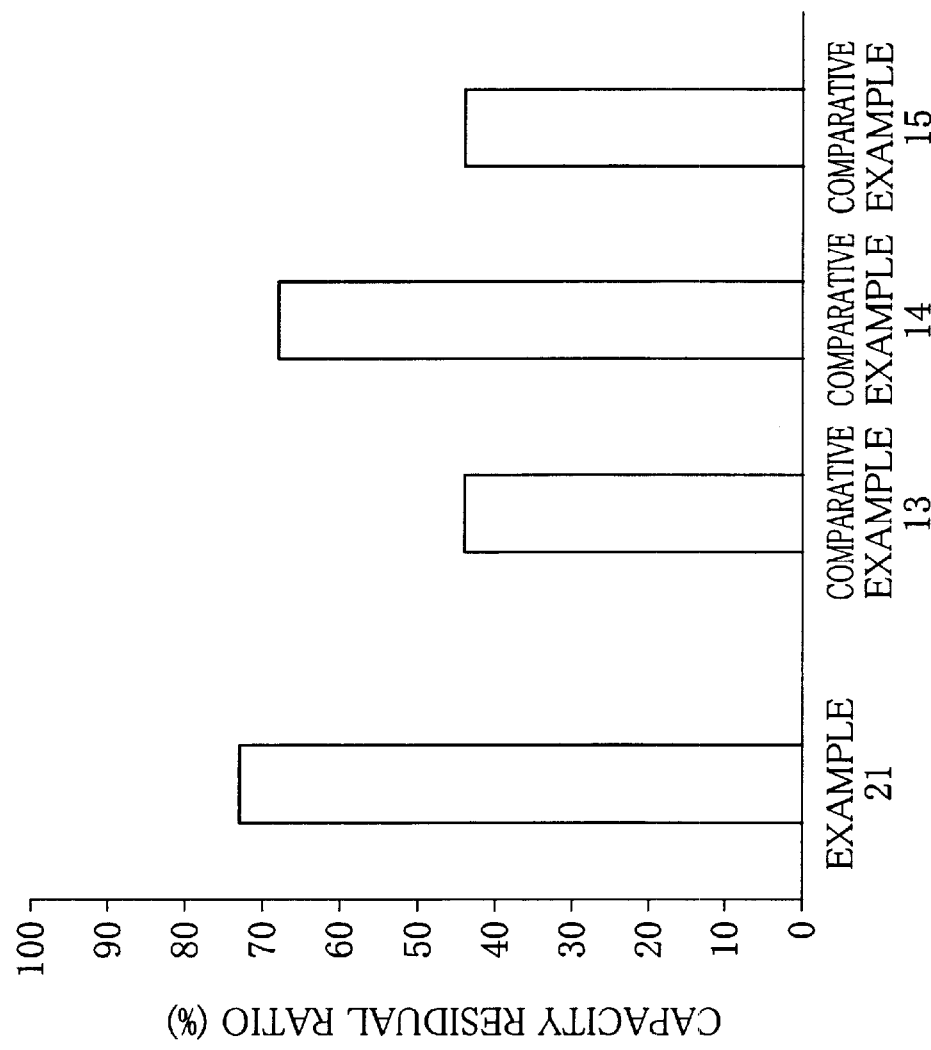
FIG. 15 is a graph depicting the capacity residual ratio of each battery according to Example 21 and Comparative Examples 13 to 15.

From FIG. 15, the following points are evident.
1. As is evident in comparison between Example 21 and Comparative Example 13, even if active substances are identical to each other, the capacity residual ratio in Example 21 wherein a battery incorporates a separator to which plasma treatment is applied is higher than that in Comparative Example 13. From the foregoing, usefulness of separator plasma treatment is evident.
2. As is evident in comparison between Example 21 and Comparative Example 14, even if a separator is plasma-treated, the capacity residual ratio in Example 21 using active substances having the above active substance in which a higher-order is higher than that in Comparative Example 14. From the foregoing, the usefulness of which a nickel electrode having the above active substances is combined with a plasma-treated separator is extremely evident.

In addition, with respect to each battery shown in Table 6, charging of 1 C (−ΔV) was carried out, charge and discharge cycles were repeated until the battery voltage had been 1.0 V, a time for the battery voltage to be 1.0 V was measured by each cycle, and the discharge capacity was calculated.

The number of cycles when the discharge capacity of Example 21 indicated 60% of the nominal capacity was counted. At this time, the number of cycles is defined as "$a_0$" (counts).

The number of cycles when the discharge capacity of batteries of comparative Examples indicated 60% of the nominal capacity was counted. At this time, the number of cycles is defined as "a" (counts).

$a \times 100/a_0$ was calculated as a cycle number ratio (%). The calculation results are shown in FIG. 16.

Figure 16:
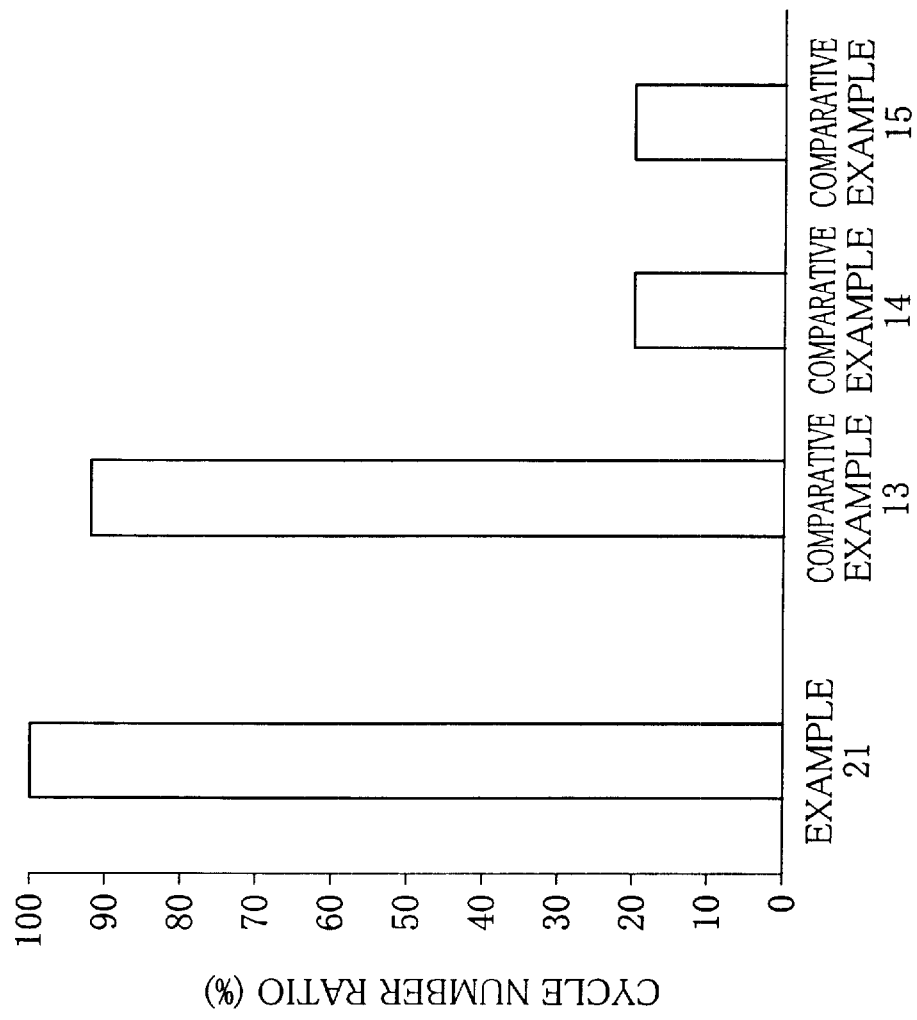
FIG. 16 is a graph depicting the cycle number rate (%) of each battery according to Example 21 and Comparative Example 13 to 15.

As is evident from FIG. 16, the batteries of Comparative Examples wherein the plasma-treated separator and the nickel electrode using active substances in which higher-order cobalt oxides are formed in advance are not combined with each other, are smaller than those of Examples according to the present invention in cycle number ratio, and are lowered in charge and discharge cycle life performance.

EXAMPLE 22

When plasma treatment is carried out for the non-woven fabric employed in Example 21 under the conditions of Example 21, the treatment time is changed as shown in Table 7, and plasma treatment was carried out to make separators $Q_1$ to $Q_5$. The contact angles of these separators were measured.

ESCA measurement is carried out to the obtained treatment material, and O/C ratio in the site of 24 Å depth and 70 Å depth from the surface is measured.

Then, a nickel-metal hydride secondary battery was assembled in a manner similar to that in the case of Example 21 by employing each treatment material. The capacity residual ratios of these batteries were measured in the same manner as that in Example 21. Similarly, the cycle number ratio to the battery of Example 21 was measured. The capacity residual ratios are shown in FIG. 17, and the cycle number ratios are shown in FIG. 18.

TABLE 7

|  | Treatment time of oxide plasmas to non-woven fabric | Contact angle ($\Omega$) | O/C ratio by ESCA measurement | |
| --- | --- | --- | --- | --- |
|  |  |  | Depth of 24 Å from surface | Depth of 70 Å from surface |
| Separator $Q_1$ | 10 seconds | 31 | 0.01 | 0.005 |
| Separator $Q_2$ | 30 seconds | 0 | 0.39 | 0.05 |
| Separator $Q_3$ | 5 minutes | 0 | 0.39 | 0.20 |
| Separator $Q_4$ | 30 minutes | 0 | 0.42 | 0.30 |
| Separator $Q_5$ | 60 minutes | 0 | 0.60 | 0.50 |

Figure 17:
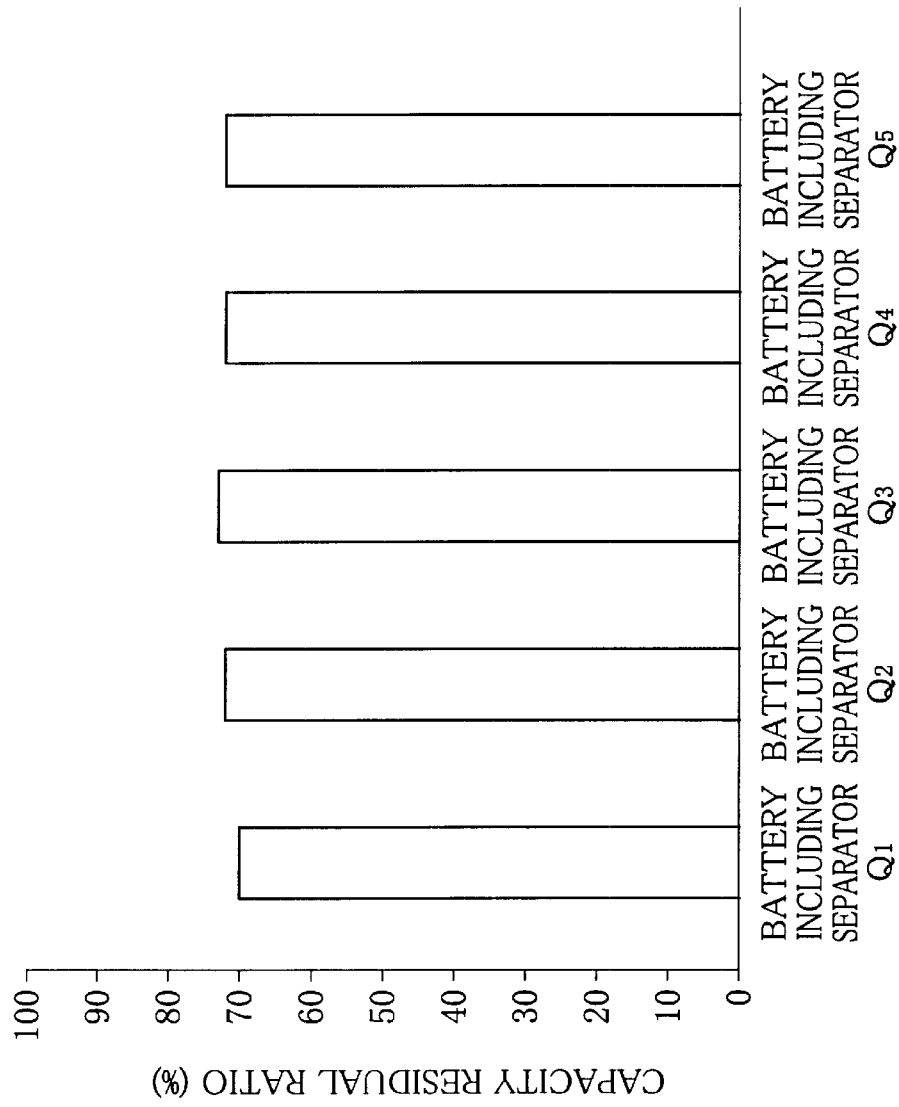
FIG. 17 is a graph depicting the capacity residual ratio of batteries each including separators Q1 to Q5.
Figure 18:
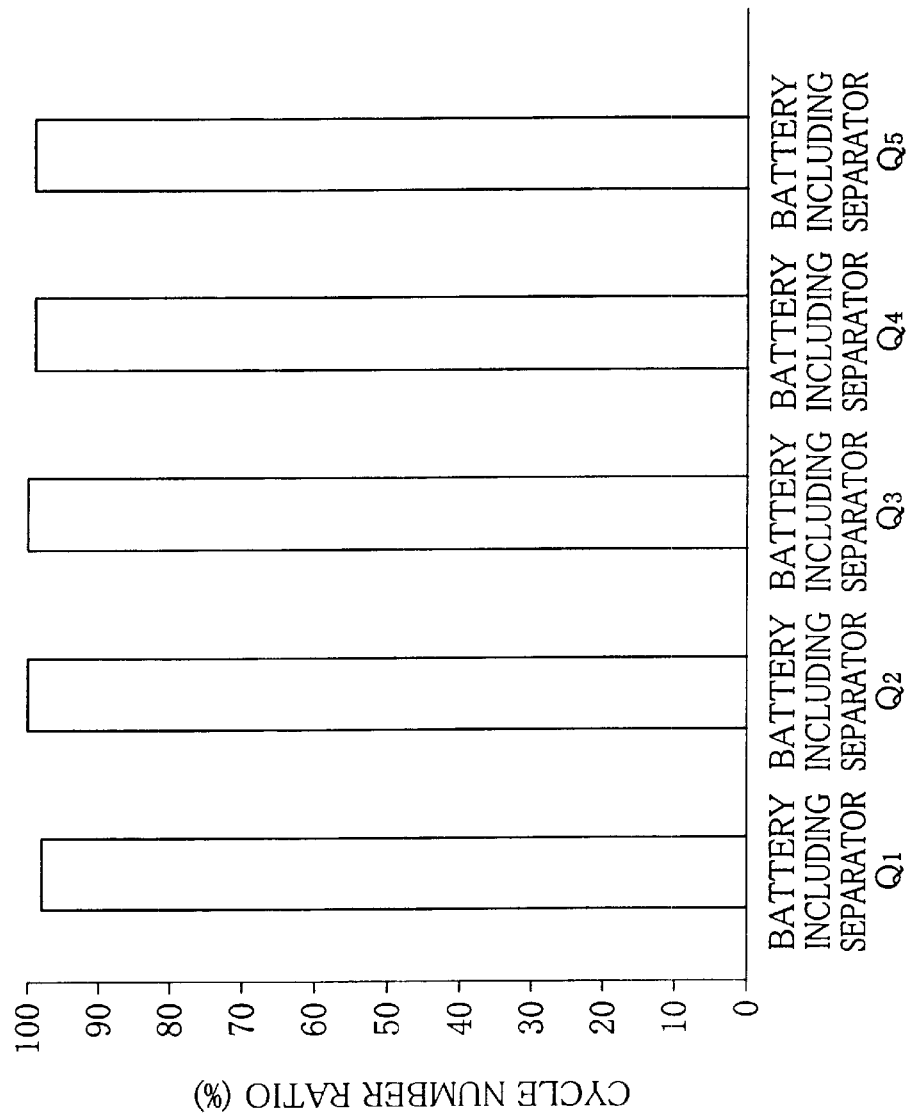
FIG. 18 is a graph depicting the cycle number rate (%) of batteries each including separators Q1 to Q5.

As is evident from Table 7, FIG. 17 and FIG. 18 in a plasma-treated separator so that a portion of depth of about 24 Å is 0.01 to 0.6 in O/C ratio, both of the self-discharge properties of a battery having the separator incorporated therein and the charge and discharge cycle life performance indicate a proper value.

What is claimed is:
1. A battery separator manufacturing method comprising:
   arranging a separator material comprising a synthetic resin on an earth electrode of a plasma treatment apparatus having a power electrode and the earth electrode arranged in parallel; and
   carrying out said plasma treatment of said separator material in an atmosphere comprising at least one gas for imparting hydrophilicity,
   wherein the separator material is in direct contact with a surface of the earth electrode but it is not in contact with a surface of the power electrode during said plasma treatment; and wherein said plasma treatment is carried out in a state that a mask comprising titanium or stainless steel is disposed on said separator material.

2. The battery separator manufacturing method according to claim 1, wherein said atmosphere comprises a mixture of a gas for imparting hydrophilicity and a gas for imparting hydrophobicity.

3. The battery separator manufacturing method according to claim 1, wherein said plasma treatment is carried out in a gas for imparting hydrophobicity after being carried out in a gas for imparting hydrophilicity or said plasma treatment is carried out in a gas for imparting hydrophilicity after being carried out in said gas for imparting hydrophobicity.

4. The battery separator manufacturing method according to claim 1, wherein a gas for imparting hydrophilicity is at least one gas selected from the group consisting of oxygen, nitrogen, air, nitrogen oxides, ammonia and carbon dioxide, and said gas for imparting hydrophobicity is at least one selected from the group consisting of tetra-fluorinated carbon, tetra-fluorinated ethylene, and hexa-fluorinated ethane.

5. The battery separator manufacturing method according to claim 1, wherein the separator material comprises synthetic resin fibers.

6. The battery separator manufacturing method according to claim 5, wherein the separator material is a non-woven fabric.

7. The battery separator manufacturing method according to claim 6, wherein the non-woven fabric has a basis weight of 30 to 70 g/m$^2$.

8. The battery separator manufacturing method according to claim 1, wherein the separator material comprises finely porous plastic sheets.

9. The battery separator manufacturing method according to claim 1, wherein the separator material has a specific surface area measured by a BET 1-point method using nitrogen of 0.5 to 5.0 m$^2$/g.

10. The battery separator manufacturing method according to claim, 1 wherein the plasma has a 2000 to 4000° K. electron temperature, an electron density of $10^9$ to $10^{13}$ particles/cm$^3$, an ion temperature of 200 to 400° K., and ion density of $10^9$ to $10^{13}$ particles/cm$^3$, and a plasma spatial potential of 10 to 90 V.

11. The battery separator manufacturing method according to claim 1, wherein said separator material after plasma treatment has an O/C ratio of 0.01 to 0.6.

* * * * *